US012713375B2

(12) United States Patent
Awad et al.

(10) Patent No.: US 12,713,375 B2
(45) Date of Patent: Aug. 18, 2026

(54) APPARATUS AND METHODS FOR TRANSMISSION OF TIMING INFORMATION

(71) Applicant: Sony Group Corporation, Tokyo (JP)

(72) Inventors: Yassin Aden Awad, Basingstoke (GB); Vivek Sharma, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 563 days.

(21) Appl. No.: 17/918,333

(22) PCT Filed: Mar. 24, 2021

(86) PCT No.: PCT/EP2021/057600

§ 371 (c)(1),
(2) Date: Oct. 12, 2022

(87) PCT Pub. No.: WO2021/209235

PCT Pub. Date: Oct. 21, 2021

(65) Prior Publication Data

US 2023/0141032 A1 May 11, 2023

(30) Foreign Application Priority Data

Apr. 16, 2020 (EP) .................................... 20169975

(51) Int. Cl.
*H04W 56/00* (2009.01)

(52) U.S. Cl.
CPC ... *H04W 56/0045* (2013.01); *H04W 56/0015* (2013.01)

(58) Field of Classification Search
None
See application file for complete search history.

(56) References Cited

U.S. PATENT DOCUMENTS

2015/0304066 A1* 10/2015 Dutti ...................... H04B 10/27 398/98
2018/0323890 A1* 11/2018 Zhang .................. H04J 3/0658
(Continued)

FOREIGN PATENT DOCUMENTS

WO 2021/209193 A1 10/2021

OTHER PUBLICATIONS

3GPP, "3rd Generation Partnership Project; Technical Specification Group Radio Access Network; Study on Scenarios and Requirements for Next Generation Access Technologies;(Release 15)", 3GPP TR 38.913 V15.0.0, Jun. 2018, total 39 pages.
(Continued)

*Primary Examiner* — Saad Khawar
(74) *Attorney, Agent, or Firm* — XSENSUS LLP

(57) ABSTRACT

A method of operating a communications device in a wireless communications network is provided, the method comprising transmitting to an infrastructure equipment of the wireless communications network a time source indication, the time source indication indicating to the infrastructure equipment that the communications device is a source of timing information. The timing information may be in accordance with a non-3GPP protocol, may be generated outside of the wireless communications network, and/or may be used by entities (including logical protocol entities, applications and the like) which are outside of the scope of 3GPP specifications. An example of such timing information is time information which is compliant with the IEEE 802.1AS specification. According to the present methods, a wireless communications network can support time sensitive networking based on timing information which may have its origin and/or destination(s) outside the scope of the wireless communications network.

20 Claims, 13 Drawing Sheets

(56) References Cited

U.S. PATENT DOCUMENTS

| | | | | |
|---|---|---|---|---|
| 2019/0007151 | A1* | 1/2019 | Goel | H04W 56/0015 |
| 2019/0132762 | A1* | 5/2019 | Zhu | H04B 7/024 |
| 2019/0141590 | A1* | 5/2019 | Li | H04W 52/245 |
| 2020/0259896 | A1* | 8/2020 | Sachs | H04L 67/12 |
| 2021/0195654 | A1* | 6/2021 | Lei | H04W 72/21 |
| 2022/0361129 | A1* | 11/2022 | Fan | H04W 56/0045 |
| 2023/0134036 | A1* | 5/2023 | Larsson | H04W 56/0055 370/350 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, total 430 pages.

3GPP, "3rd Generation Partnership Project; Technical Specification Group Services and System Aspects; System architecture for the 5G System (5GS);Stage 2", 3GPP TS 23.501 V16.3.0, Dec. 2019, total 417 pages.

Huawei et al., "Sidelink synchronization mechanisms for NR V2X", 3GPP TSG RAN WG1 Meeting #96, R1-1901539, Feb. 25-Mar. 1, 2019, Athens, Greece, total 9 pages.

Nokia et al., "Updates to TSN Synchronization solution for compliance with 802.1 AS", SA WG2 Meeting #134 S2-1907530, Jun. 24-28, 2019, Sapporo, Japan, total 5 pages.

Ericsson, "Support of solution 28A in SA2", 3GPP TSG-RAN WG2 #106, Tdoc R2-1906836, May 13-17, 2019, Reno, Nevada, USA, total 2 pages.

Aamir Mahmood et al. "Time Synchronization in 5G Wireless Edge: Requirements and Solutions for Critical-MTC", total 7 pages.

LAN/MAN Standards Committee of the IEEE Computer Society, "Timing and Synchronization for Time-Sensitive Applications", IEEE P802.1AS-Rev/D7.5, Dec. 18, 2018, total 444 pages.

Harri Holma et al., "LTE for UMTS OFDMA and SC-FDMA based radio access", John Wiley and Sons, Ltd, 2009, total 232 pages.

3GPP, "3rd Generation Partnership Project; Technical Specification Group Radio Access Network; NR; NR and NG-RAN Overall Description; Stage 2 (Release 15)" 3GPP TS 38.300 V15.8.0, Dec. 2019, total 99 pages.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, total 532 pages.

Qualcomm Incorporated, "Discussion SA2 LS on RAN Impact analysis due to TSN", 3GPP TSG-RAN WGI #AH-1901, RI-1900869, Jan. 21-25, 2019, Taipei, Taiwan, total 7 pages.

Nokia et al. "Revised SID: Study on NR Industrial Internet of Things (IoT)", 3GPP TSG RAN meeting #81 RP-182090, Sep. 10-13, 2018, Gold Coast, Australia, total 5 pages.

Nokia et al., "Revised SID: Study on enhanced support of Industrial IoT—TSC/URLLC enhancements", SA WG2 Meeting #137E S2-2002594, Feb. 24-27, 2020, Elbonia, total 3 pages.

* cited by examiner

APPARATUS AND METHODS FOR TRANSMISSION OF TIMING INFORMATION

CROSS-REFERENCE TO RELATED APPLICATIONS

The present application is based on PCT filing PCT/EP2021/057600, filed Mar. 24, 2021, which claims priority to EP 20169975.8, filed Apr. 16, 2020, the entire contents of each are incorporated herein by reference.

BACKGROUND

Field

The present disclosure relates to apparatus and methods for transmitting timing information in a wireless communications network.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Systems incorporating NR technology are expected to support different services (or types of services), which may be characterised by different requirements for latency, data rate and/or reliability. For example, a target for the Enhanced Mobile Broadband (eMBB) service is to provide a reliability of 10% with a user plane latency of 4 ms and a target for the Ultra Reliable & Low Latency Communications (URLLC) services is to provide a reliability of $1\text{-}10^{-5}$ (99.999%) or higher for one transmission of a 32 byte packet with a user plane latency of 1 ms [3]. In addition, systems may be expected to support further enhancements related to the Industrial Internet of Things (IIoT) in order to support services with new requirements of high availability, high reliability, low latency, and in some cases, high-accuracy timing information. Existing timing information protocols outside of the scope of 3GPP/5G may be suitable for providing such timing information.

There is thus a need to provide wireless communication network equipment which is capable of transmitting accurate timing information within and across a wireless communications network.

SUMMARY

The present disclosure can help address or mitigate at least some of the issues discussed above.

Example embodiments of the present technique can provide a method of operating a communications device in a wireless communications network, the method comprising transmitting to an infrastructure equipment of the wireless communications network a time source indication, the time source indication indicating to the infrastructure equipment that the communications device is a source of timing information.

Embodiments can provide for the transmission of accurate timing information via a wireless communications network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
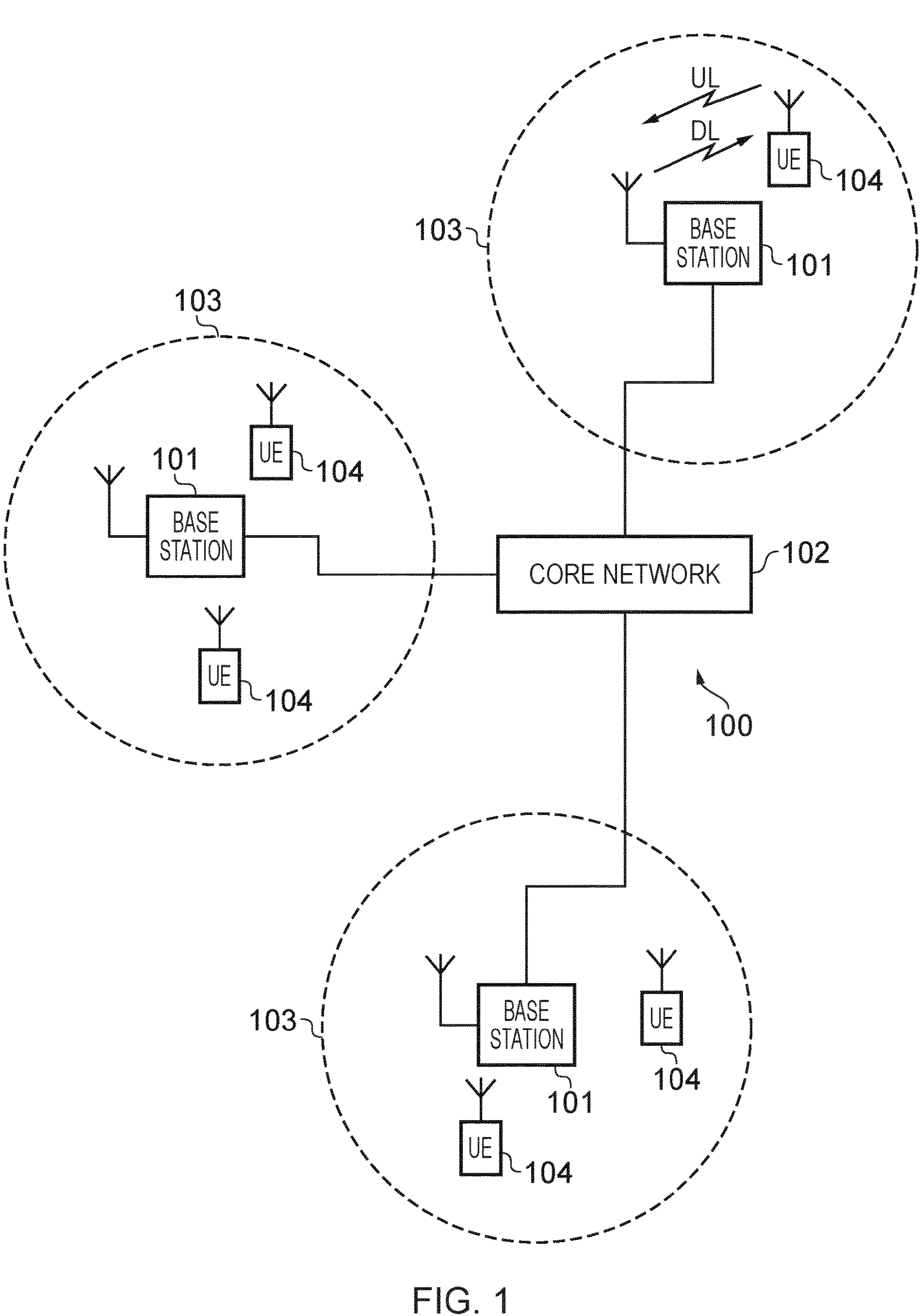
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
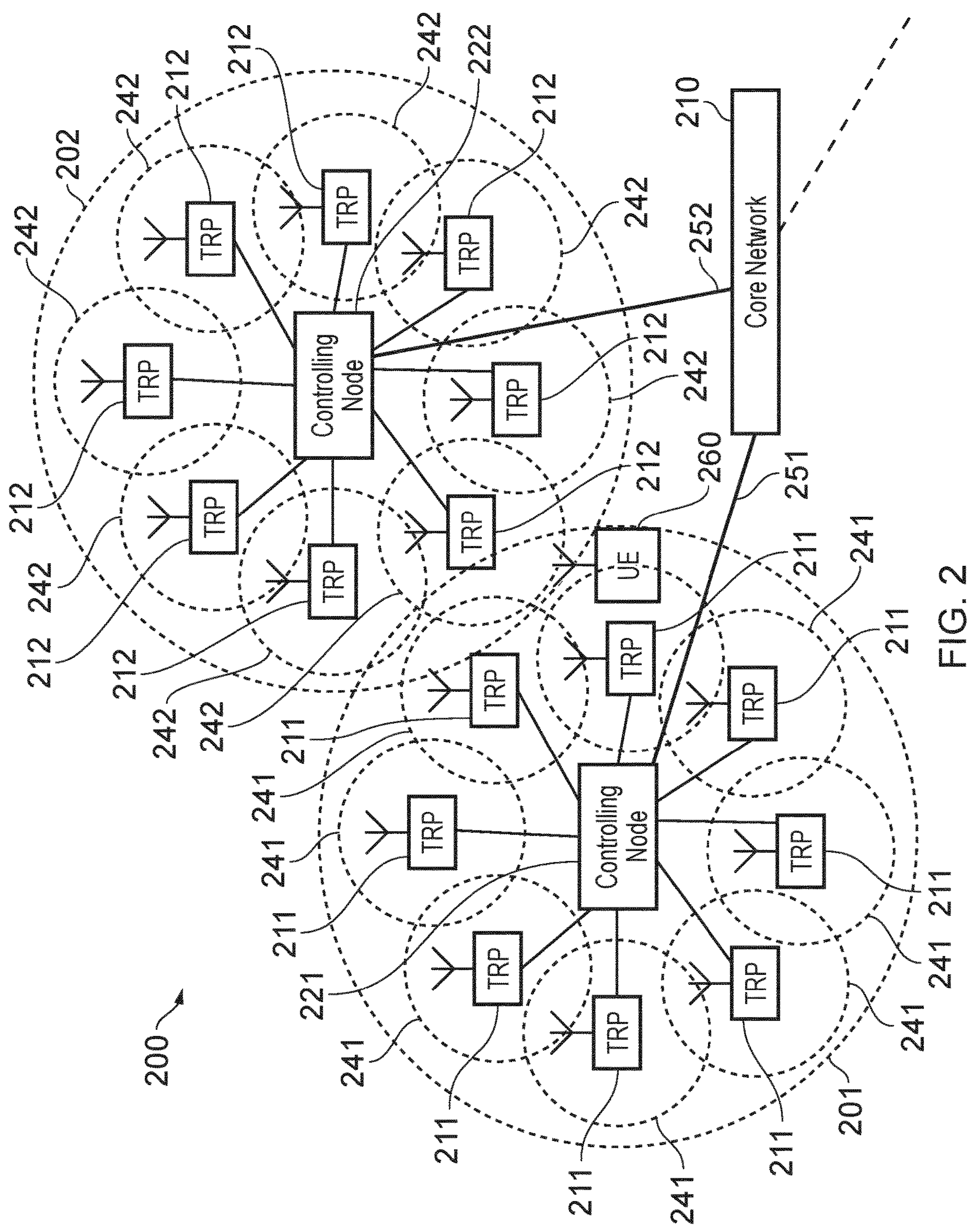
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand.

For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
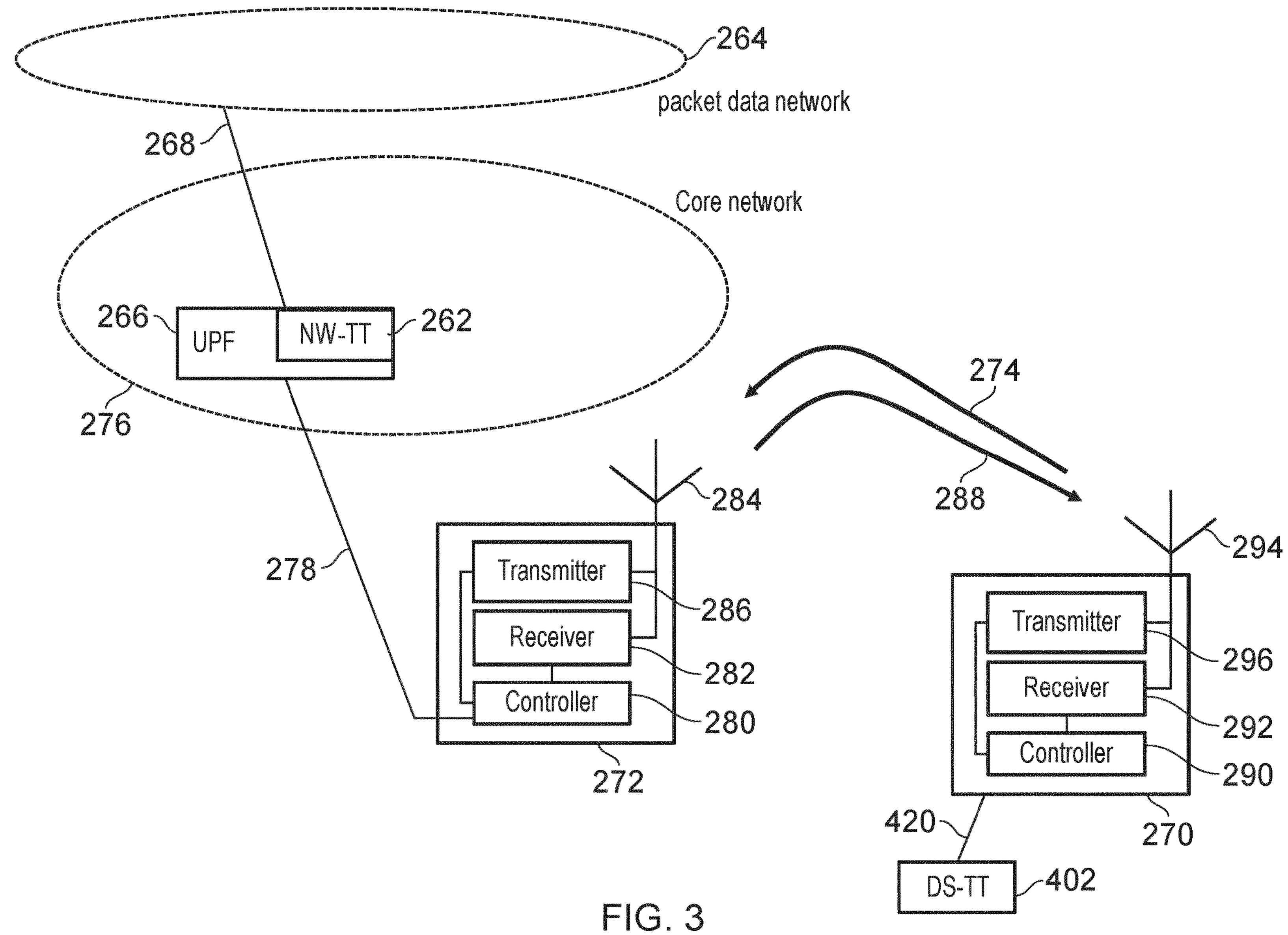
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as an eNB 101 or a gNB (e.g. a combination of a controlling node 221 and TRP 211), is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272.

The core network 276 comprises nodes may correspond to the core network part 102 of FIG. 1 or the core network component 210 of FIG. 2. The core network 276 provides connectivity to other networks, such as the packet data network 264 which may be operated independently of the wireless communications network. For example, the packet data network 264 may provide access to the internet.

Data from the packet data network 264 destined for the UE 270 may be received in the wireless communications network by a user plane function 266 within the core network 276. Similarly, data transmitted by the UE 270 to the infrastructure equipment 272, having as its destination an entity within, or reachable via, the packet data network 264 may be routed through the core network 276 via the user plane function (UPF) 266. The UPF 266 may comprise circuitry (such as a processor and associated memory), computer-readable medium having stored thereon a program comprising instructions to be carried out by the processor, and interface circuitry (e.g. transmitter and receiver circuitry) for transmitting and receiving data and other control information from infrastructure equipment, entities in the packet data network and other core network entities.

In accordance with some embodiments of the present technique, as will be described in more detail below, the UPF 262 may comprise, or perform the functionality of, a network time sensitive networking (TSN) translator (NW-TT) 262.

It will be appreciated that the core network 276 may comprise more than one UPF, and may comprise other entities, such as those responsible for performing control plane management functions.

The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

In accordance with some embodiments of the present technique, as will be described further below, the UE/communications device 270 may associated with (e.g. may comprise, perform the function of, or be connected to other than via the wireless access interface 274, 288) a device side TSN translator (DS-TT) 402. The DS-TT 402 may be connected to the communications device 270 via an interface 420, which may be a wired interface, a non-3GPP wireless interface or any other suitable interface. Where the communications device 270 performs the function of the DS-TT 402, the interface may be a logical interface (such as an API provided to the DS-TT 402).

The UPF 266 and the NW-TT 262 and DS-TT 402 (when not integrated with the UPF 266 or communications device 270) may comprise a processor, memory and one or more suitable communication interfaces. The processing steps described herein may be carried out by, for example, a microprocessor in conjunction with a random access memory, operating according to instructions stored on a computer readable medium.

Timing Information in Wireless Communications Networks

Generally, a wireless communications network may comprise a time source (e.g. a suitably stable and accurate clock), and may distribute a time signal to entities within the network, which may include base stations, core network equipment, and communications devices.

In Release 15 of 3GPP's NR specifications, timing information may be distributed from a base station to a communications device via a wireless access interface. The timing information may be included in a system information message, which may be broadcast to multiple communications devices simultaneously. In Release 15 [4] this may include GPS time and Coordinated Universal Time (UTC), and based on this timing information, the communications device may determine a local time.

In 3GPP Release 16, the system information has been enhanced to permit the inclusion of a 5G internal system clock. This information may also be provided via unicast signalling (e.g. via a DLInformationTransfer message) to a single communications device.

However, a wireless communications network may be used to transfer other timing information. The other timing information may be in accordance with a non-3GPP protocol, may be generated outside of the wireless communications network, and/or may be used by entities (including logical protocol entities, applications and the like) which are outside of the scope of 3GPP specifications.

An example of such other timing information is time information which is compliant with the IEEE 802.1AS specification.

The IEEE 802.1AS information can be carried transparently by network elements, so that, for example, it could be transported via a 3GPP network (such as a 3GPP 5G NR network) as user plane data. There is no requirement that the transport network (in this case, the 3GPP 5G network) be aware of the presence of the other timing information. However, the edges of the 3GPP 5G network which interwork with other networks or entities outside of the scope of 3GPP (e.g. a user plane function connecting to an external network, or a user equipment) may function as IEEE 802.1AS "TSN translators" (TT) [5] and may support various functions defined in IEEE 802.1AS.

It has been proposed to study enhancements to a 5G System that would enable enhanced support of Time Sensitive Communication and deterministic applications [6].

Figure 4:
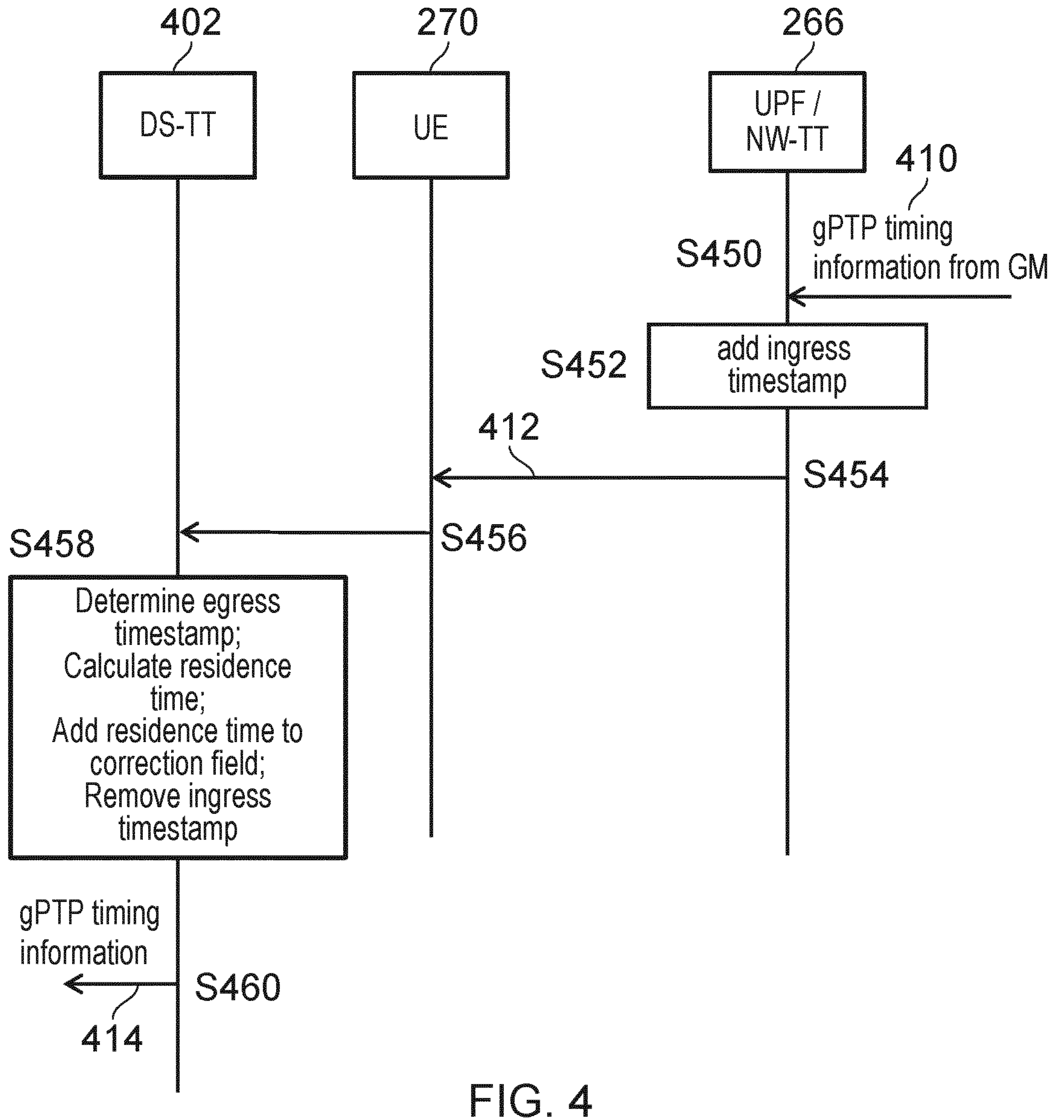
FIG. 4 is a message sequence chart illustrating the distribution of timing information via a 3GPP 5G network, in accordance with known techniques.

FIG. 4 shows a message sequence chart illustrating the distribution of timing information via a 3GPP 5G network, in accordance with known techniques.

In the example of FIG. 4, the timing information is timing information compliant with the IEEE 802.1AS standard. It will be appreciated that the principles and embodiments described herein may be applicable to other timing information, and the present disclosure is not limited to timing information compliant with IEEE 802.1AS.

The IEEE 802.1AS specification defines a grand master (GM) clock which acts as the source of timing information.

In the example of FIG. 4, the GM is located externally to the 3GPP network, for example within the packet data network 264 of FIG. 3. The 3GPP network (i.e. all entities within the scope of the 3GPP standards, including logical entities within the communications device 270) may act as a "time-aware system". This may be achieved by providing TSN translator (TT) functions at the edges of the 5G system. For example, the UPF 266 which receives the timing information from the packet data network 264 may incorporate TT functionality. Similarly, the communications device 270, which forwards the timing information to applications running on the communications device 270 and/or to other logical or physical entities may have an associated TT function. The TT at the communications device 270 is referred to as a device-side TSN translator (DS-TT), and the TT at the UPF 266 is referred to as a network TSN translator (NW-TT).

FIG. 4 shows the UPF 266 (incorporating the NW-TT functionality 262), the communications device 270 and the DS-TT 402 associated with the communications device 270.

At step S450, the NW-TT 262, acting as a timing information ingress entity, receives inbound timing information 410 from the GM via the packet data network 264. In the case of IEEE 802.1AS timing information, the inbound timing information 410 may be in the form of a gPTP packet.

At step S452, the NW-TT 266 adds an ingress timestamp to the timing information.

At step S454, the modified timing information 412 is forwarded via the user plane of the 5G network to one or more recipients via an established protocol data unit (PDU) session. In the example of FIG. 4, the modified timing information 412 is received at the communications device 270, which forwards it to its associated DS-TT 402 at step S456. In the example of FIG. 4, the DS-TT 402 acts as the timing information egress entity.

At step S458, the DS-TT determines an egress timestamp, determines a residence time corresponding to the delay between the receipt of the timing information 410 at the NW-TT 262 and the receipt of the modified timing information 412 at the DS-TT, based on the egress timestamp and the ingress timestamp in the modified timing information 412. The DS-TT 402 then updates a correction field within the gPTP packet and removes the ingress timestamp to form outbound timing information 414. The outbound timing information 414 is forwarded at step S460.

It will be appreciated that the DS-TT 402 and NW-TT 262 may perform other functionality as required by the appropriate protocol (e.g. IEEE 802.1AS).

In general, "timing information" as used herein, unless otherwise specified, may refer to timing information having an associated domain which extends, or may extend, beyond the scope of a wireless communications network, such as a 5G network, because for example, it has, or may have, as its origin and/or destination(s) an entity (logical or physical) whose functionality is outside of the scope of specifications applicable to the wireless communications network (such as the 3GPP specifications for 5G).

In accordance with conventional techniques, non-3GPP timing information is distributed substantially transparently within the 5G network. There is thus a need to identify enhancements to the 5G network which can improve the support for the distribution of such timing information, such that a 5G network can better support time sensitive networking based on timing information which may have its origin and/or destination(s) outside the scope of the 5G network.

Embodiments of the present technique can provide method of operating a communications device in a wireless communications network, the method comprising transmitting to an infrastructure equipment of the wireless communications network a time source indication, the time source indication indicating to the infrastructure equipment that the communications device is a source of timing information.

According to embodiments of the present technique, infrastructure equipment determines that a communications device is a source of timing information. The determination may be based on an indication received from the communications device or from a core network entity, such as a core network entity which stores subscription information associated with the communications device. The infrastructure equipment may be a part of a radio access network, such as a gNB.

The indication may be a timing source indication. The timing source indication may indicate that the communications device provides (or can provide), via the wireless communications network, timing information derived from a grandmaster (GM) timing information source.

In response to determining that a communications device is a source of timing information, the infrastructure equipment may configure the communications device in a particular manner.

For example in accordance with some embodiments of the present technique, in response to determining that a communications device is a source of timing information, the infrastructure equipment may:

- apply a modified RRC connection release algorithm,
- apply a modified RRC connection suspend algorithm,
- allocate communication resources for the transmission of uplink and/or downlink data to minimise a delay incurred in the transmission of timing information or associated control information relating to the provision of the timing information,
- apply a modified handover procedure, and/or
- prioritise downlink data transmissions to the communications device over downlink data transmissions to another communications device to minimise a delay incurred in the transmission of the associated control information relating to the provision of the timing information.

In general, a modified algorithm may refer to an algorithm which differs in some aspect from a corresponding algorithm applied in respect of a communications device which has not been determined to be a source of timing information.

According to the modified RRC connection release algorithm, the infrastructure equipment refrains from releasing an RRC connection established with the communications device, irrespective of a duration of an idle time during which no data has been transmitted by or transmitted to the communications device. In addition, or alternatively, the infrastructure equipment releases the RRC connection only in response to an explicit request to do so from the communications device, or in response to a change of serving cell of the communications device (e.g. by means of a handover procedure).

In some embodiments, the infrastructure equipment may release the RRC connection established with the communications device in response to a request to do so received from a core network entity.

According to the modified RRC connection suspend algorithm, the infrastructure equipment refrains from suspending an RRC connection established with the communications device, irrespective of a duration of the idle time during which no data has been transmitted by or transmitted to the communications device. In addition, or alternatively, the infrastructure equipment suspends the RRC connection only in response to an explicit request to do so from the communications device.

In some embodiments, the infrastructure equipment allocates resources for the communications device to minimise a delay incurred in the transmission of timing information or associated control information relating to the provision of the timing information. For example, in some embodiments, periodic uplink resources be allocated (e.g. by means of a configured grant, or semi-persistent scheduling, SPS, or the like) to permit low latency transmission of timing information (in the uplink) and associated control information (e.g. for measuring latency, or residence times) in the downlink. In some embodiments, a periodicity of resources allocated by a configured grant or similar periodic allocation is based on (e.g. equal to) a periodicity of the transmission of timing information from the UE.

In some embodiments, a communications device (which may be a communications device associated with either an ingress node or an egress node for timing information) may transmit an indication of a periodicity of provided or required clock updates. In response, the infrastructure equipment may allocated periodic resources (e.g. by means of a configured grant or SPS), having a periodicity based on the indicated clock update periodicity.

Accordingly, embodiments of the present technique can allow an infrastructure equipment to efficiently allocate resources for the transmission of timing information. The allocated resources may be uplink resources (for a communications device transmitting timing information) or downlink (for a communications device receiving timing information).

In some embodiments, the infrastructure equipment prioritises the transmission of downlink data to the communications device, relative to downlink data for transmission to other communications devices. In some embodiments, a PDU session is established for the transmission of uplink and downlink data comprising, and/or associated with the timing information. Accordingly, in some embodiments, on receiving data from the core network associated with that PDU session, the infrastructure equipment prioritises the transmission of that data to the communications device, relative to other data received from the core network.

An example of the modified handover procedure is described in further details below.

Figure 5:
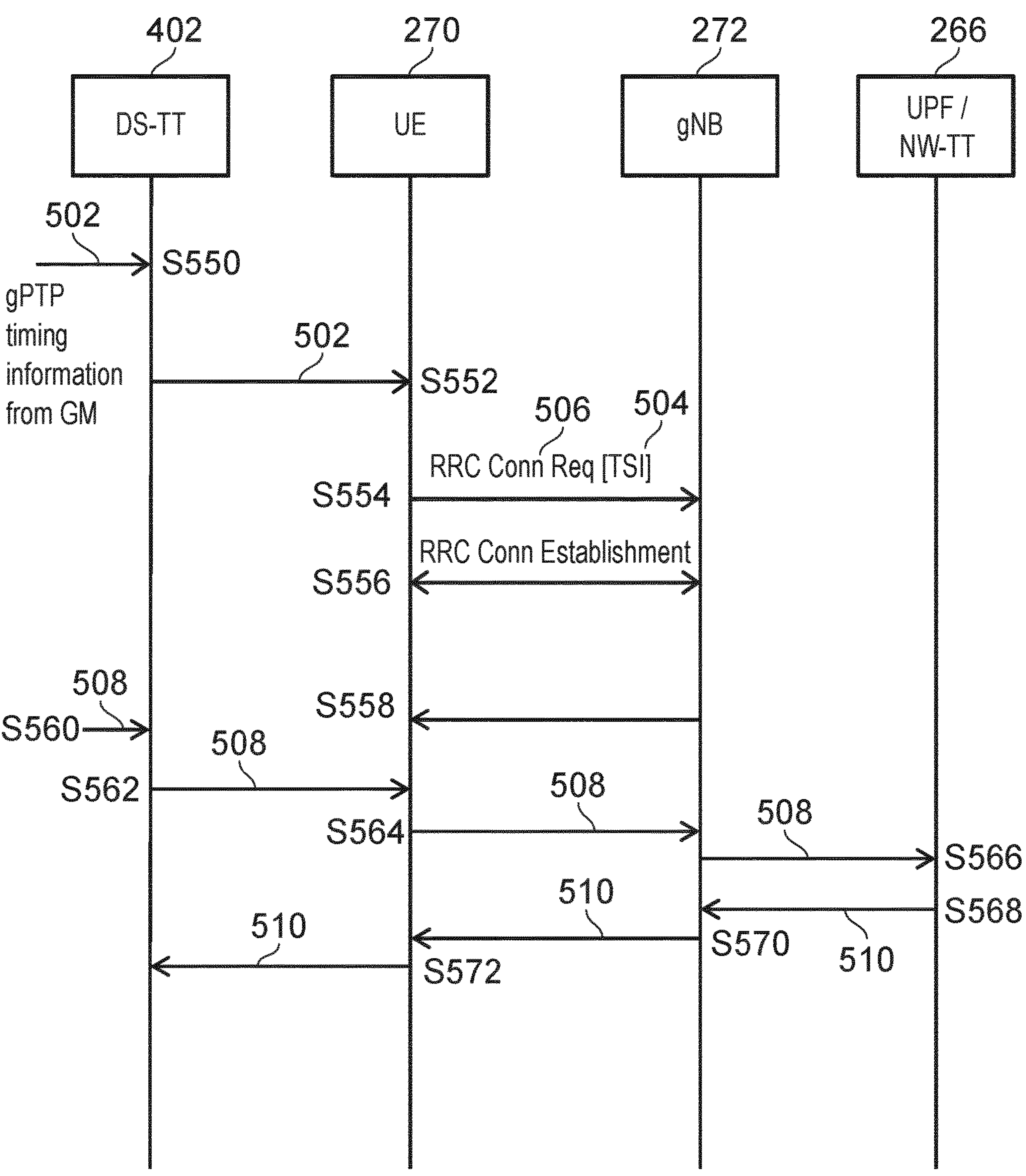
FIG. 5 is a message sequence chart illustrating an example message flow in accordance with embodiments of the present technique.

FIG. 5 is a message sequence chart illustrating an example message flow in accordance with embodiments of the present technique.

In the example of FIG. 5, the communications device 270 is associated with the DS-TT 402 which initially receives timing information 502 from a grandmaster at step S550. At step S552, the DS-TT 402 forwards the timing information 502 to the communications device 270.

At step S554, in response to receiving the timing information 502, the communications device 270 establishes an RRC connection and an associated PDU session for the transmission of the timing information 502, and subsequent timing information and, in some embodiments, control information associated with the distribution of the timing information.

The establishment of the RRC connection may comprise well-known steps, such as a transmission on a random access channel, and a handshake to resolve any contention. For conciseness, not all steps of the RRC connection establishment are shown in FIG. 5. An example of a conventional RRC connection establishment is described in [7]. As part of the RRC connection establishment, according to embodiments of the present technique, the communications device 270 transmits a time source indication 504 to the infrastructure equipment 272. In the example of FIG. 5, the time source indication (TSI) 504 is transmitted within RRC Connection Request message 506. In other embodiments, the TSI 504 may be transmitted in a different message, such as an RRC Reconfiguration Complete message (not shown in FIG. 5) which is transmitted after user plane security procedures have been completed. In some embodiments, the TSI 504 may be transmitted in an RRC Setup Complete message.

In some embodiments, the infrastructure equipment 272 will store an indication that the communications device 270 has transmitted the TSI 504 for as long as the communications device 270 remains in an RRC connected state. In some embodiments, if the infrastructure equipment 272 determines that the communications device 270 should be handed over to a cell controlled by a different infrastructure equipment, the infrastructure equipment 272 will forward to the new infrastructure equipment an indication that the communications device 270 has transmitted the TSI 504.

At step S556, any remaining steps for the completion of the establishment of the RRC connection take place.

In the example of FIG. 5, step S554 occurs in response to receiving timing information at the communications device 270. However, the present disclosure is not so limited. For example, in some embodiments, step S554 may occur in response may be in response to an indication from the DS-TT 402 that the DS-TT 402 is configured to receive timing information from the GM.

In the example of FIG. 5 and in accordance with some embodiments of the present technique, in response to receiving the TSI 504, the infrastructure equipment 272 allocates at step S558 communication resources for the transmission of timing information by the communications device 270. Accordingly, at step S564 the communications device 270 is able to transmit, with very low delay, timing information 508 to the infrastructure equipment 272. The timing information 508 may have been received at the DS-TT 402 from the GM at step S560, and forwarded to the communications device 270 at step S562.

At step S566, the infrastructure equipment 272 forwards the timing information 508 to the UPF 266 and NW-TT 262. In accordance with some embodiments, the forwarding of the timing information 508 may be prioritised, relative to the forwarding of other data received from the communications device 270 or from other communications devices.

The NW-TT 262 may forward the timing information to other entities, which may be within or outside of the wireless communications network. For example, the timing information may be forwarded to entities within the packet data network 264. In some embodiments, the NW-TT 262 may process the received timing information, before forwarding it, in accordance with embodiments of the present technique as described elsewhere in the present disclosure.

At step S568, the infrastructure equipment 272 receives from the UPF 266 and NW-TT 262 control information 510 associated with the distribution of the timing information received from the GM. The control information 510 may be, for example, a request to respond to the control information 510 in order for a measurement to be made of the round-trip time between the NW-TT 262 and the DS-TT 402.

The control information 510 is associated with the PDU session associated with the RRC connection established at step S556.

In accordance with some embodiments of the present technique, at step S570, in response to receiving the control information 510 and determining that it is associated with a PDU session established for the purpose of distributing timing information from the GM, the infrastructure equipment 272 allocates with high priority downlink communication resources, and transmits the control information 510 to the communications device 270 using the allocated resources. The allocation of the downlink communication resources may comprise, for example, pre-empting an existing allocation of downlink resources and/or allocating downlink communication resources which occur before those allocated for downlink data received prior to step S568.

At step S572, the communications device 270 forwards the control information 510 to the DS-TT 402. The DS-TT 402 may subsequently respond in accordance with a specification or protocol associated with the control information.

It will be appreciated that within the scope of the present disclosure are combinations of processes other than those illustrated in FIG. 5. For example, in addition to, or instead of, the steps of FIG. 5, the infrastructure equipment 272 may refrain from releasing and/or suspending the RRC connection established at step S556, irrespective of an idle duration during which no data is transmitted to or received from the communications device 270.

In some embodiments, if the RRC connection established at step S556 is suspended, then a second TSI is transmitted by the communications device 270 to the infrastructure equipment 272 when the RRC connection is resumed.

In the example of FIG. 5, the TSI 504 is received at the infrastructure equipment 272 via the wireless access interface provided by the infrastructure equipment 272. In some embodiments, the TSI 504 is transmitted by a core network entity within the core network 276 and is received at the infrastructure equipment 272 via an interface with the core network. The core network entity may be an entity having stored subscription information associated with the communications device 270, such as an access and mobility function (AMF). The subscription information associated with the communications device 270 may indicate that the communications device 270 is a source of timing information (e.g. is associated with a timing information ingress entity).

Accordingly, embodiments of the present technique can allow timing information and associated control information to be transmitted with minimal delay within a wireless communications network, thereby ensuring the accuracy of the timing information.

In accordance with some embodiments of the present technique, a communications device may perform a cell change in order to reduce a propagation delay incurred by transmissions of timing information over a wireless access interface. The cell change may be by means of a network-controlled handover.

In accordance with some embodiments, the communications device may determine a propagation delay that would be applicable to transmissions of the timing information in a candidate cell.

In accordance with some embodiments, the communications device may determine a timing advance that would be applicable to uplink transmissions of the timing information in a candidate cell.

Figure 6:
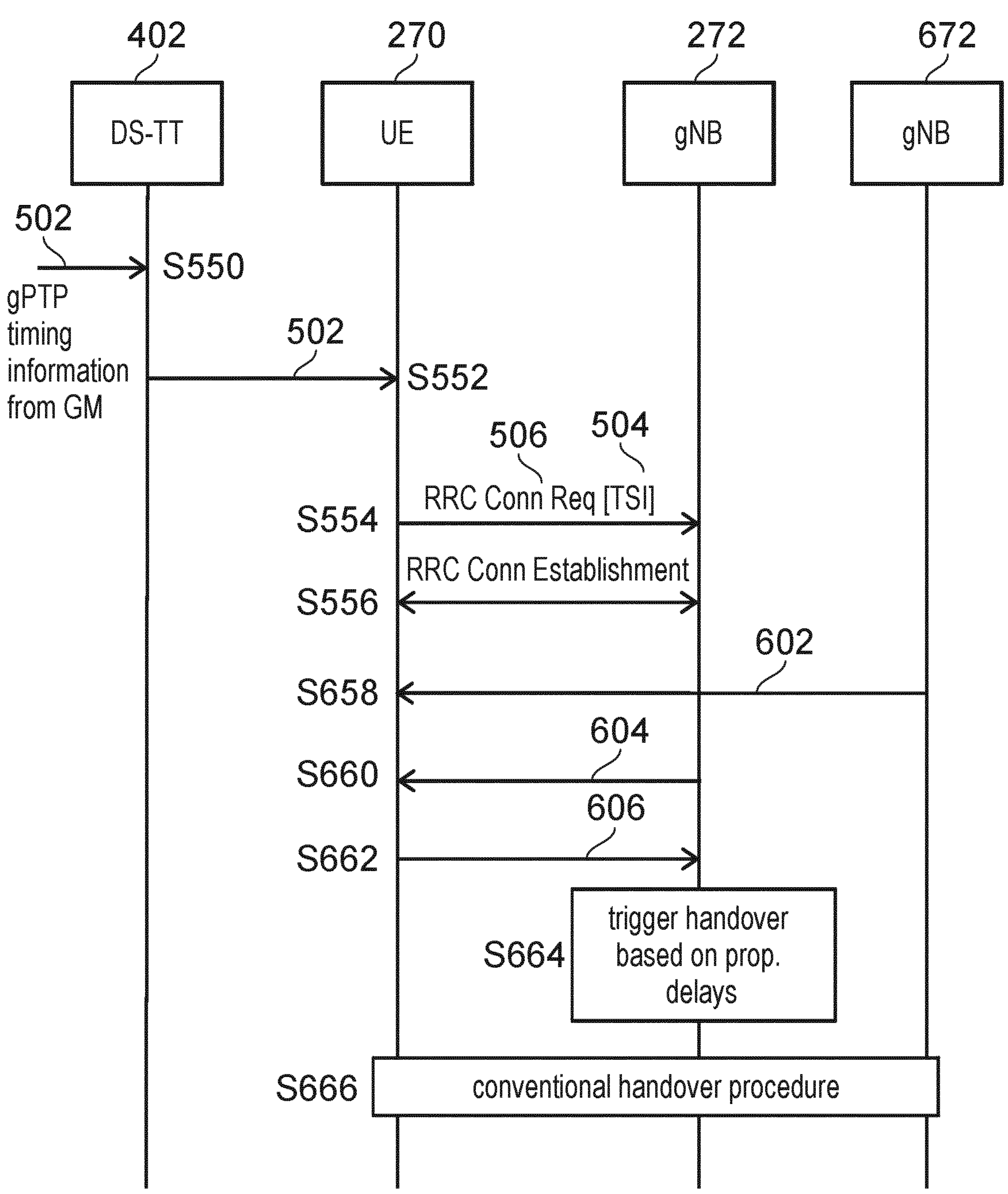
FIG. 6 is a combined message sequence chart/process flow chart for a handover procedure in accordance with embodiments of the present technique.

FIG. 6 is a combined message sequence chart/process flow chart for a handover procedure in accordance with embodiments of the present technique.

Steps S550, S552, S554, S556 may be broadly as in the example of FIG. 5.

At step S658, the communications device 270 receives signals 602 transmitted by a second infrastructure equipment 672 in a candidate cell. These signals may be measured in accordance with conventional measurement techniques, for example by measuring a signal to noise ratio, a signal to interference and noise ratio, and/or a signal quality.

In accordance with embodiments of the present technique, the communications device 270 also measures a propagation delay or timing advance that would apply to transmissions made in the candidate cell. These measurements may be made in accordance with techniques disclosed in the co-pending application [8] filed by the applicant of the present application, the content of which is incorporated herein by reference.

At step S660, the communications device 270 receives signals 604 transmitted by the infrastructure equipment 272 in the serving cell.

At step S662, the communications device 270 transmits a measurement report 606 comprising propagation information based on the propagation delay/timing advance measured at step S658. The transmission of the measurement report 606 may be in response to determining that predetermined criteria have been satisfied. These predetermined criteria may comprise conventional criteria for measurement reporting, such as based on signal strength or signal quality of signals 602, 604 received from the serving and candidate cells.

In some embodiments, the predetermined criteria may comprise a criteria that a propagation delay or timing advance for the candidate cell is lower than that of the serving cell.

At step S664, the infrastructure equipment 272 determines that the communications device 270 should change its serving cell to the candidate cell, by means of a handover procedure. This determination may be based, at least in part, on a determination that a propagation delay or timing advance for the candidate cell is lower than that of the serving cell.

At step S666, in response to the determination at step S664, the infrastructure equipment 272 initiates a handover procedure for the communications device 270 to the candidate cell controlled by the second infrastructure equipment 672. The handover procedure may be carried out in accordance with conventional techniques.

In some embodiments, as part of the handover procedure at step S666, the infrastructure equipment 272 may transmit a timing source indication to the second infrastructure equipment 672 to indicate to the second infrastructure equipment 672 that the communications device 270 provides timing information, such as from a GM clock, in accordance with a timing information specification such as IEEE 802.1AS.

In response to receiving the timing source indication, the second infrastructure equipment 672 may proceed in accordance with example embodiments described elsewhere herein describing behaviour of an infrastructure equipment which determines that a communications device is a source of timing information.

Accordingly, embodiments of the present technique can provide for a change of serving cell for a communications device by means of a handover, such that propagation delays applicable to the transmission of timing information (and therefore inaccuracies associated with that timing information) can be reduced.

In accordance with some embodiments of the present technique, a communications device may provide an indication of a wireless access interface propagation delay to a DS-TT. Based on the indication (referred to herein as an 'uplink ingress propagation delay', UIPD indication), the DS-TT may process timing information received from a GM based on the UIPD indication before sending it to the communications device for transmission via the wireless communications network.

Figure 7:
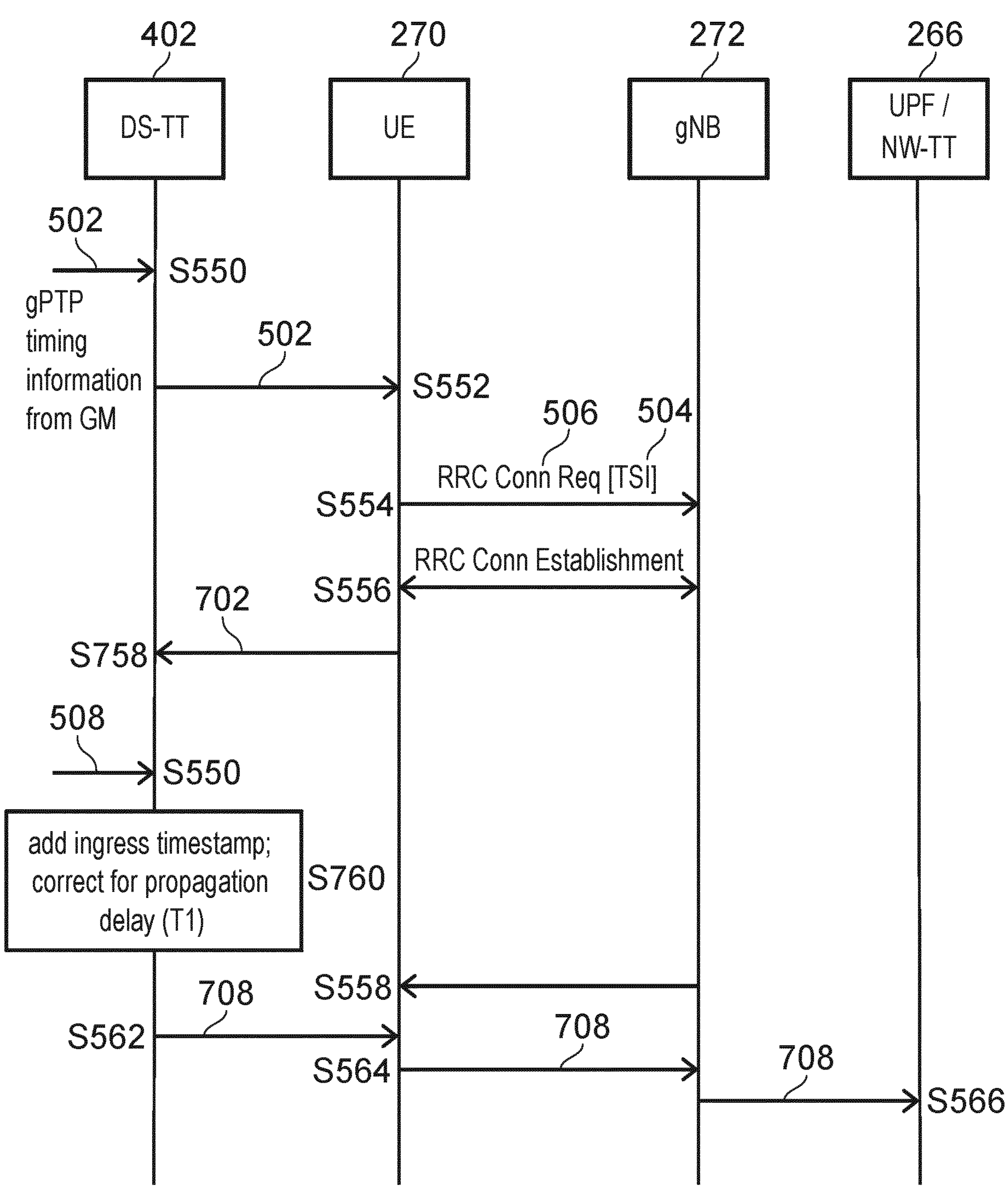
FIG. 7 is a message sequence chart illustrating an uplink ingress propagation delay indication in accordance with embodiments of the present technique.

FIG. 7 is a message sequence chart illustrating an uplink ingress propagation delay indication in accordance with embodiments of the present technique.

Steps S550, S552, S554 and S556 are correspond to the like-numbered steps shown in FIG. 5 and described above. In some embodiments, the TSI 504 is transmitted to the infrastructure equipment 272 as in the example of FIG. 5.

Prior to, or as part of the establishment of the RRC connection at steps S554 and S556, the communications device 270 receives synchronisation signals (not shown in FIG. 7) transmitted by the infrastructure equipment 272, and accordingly acquires synchronisation based on the received synchronisation signals.

However, the communications device 270 cannot determine, based on the synchronisation signals, a propagation delay for transmissions from the infrastructure equipment

272 to the communications device 270 (or for transmissions by the communications device 270 to the infrastructure equipment 272).

As part of, or prior to, the RRC connection establishment process, the communications device 270 transmits an uplink signal to the infrastructure equipment 272. The uplink signal may be a random access transmission on a physical random access channel (PRACH). Because the communications device 270 does not know the propagation delay, the uplink signal is transmitted without any compensation for the propagation delay. The timing of the transmission is based on the received synchronisation signals, such that the infrastructure equipment 272 can determine the propagation delay applicable to the uplink signal, and hence to subsequent uplink signals transmitted by the communications device 270. The infrastructure equipment transmits an indication of this propagation delay. This indication may be in the form of a timing advance (TA) indication, where the one-way propagation delay can be derived from the timing advance in accordance with known techniques. For example, the one-way propagation delay may be a half of the indicated TA value. In accordance with conventional techniques, the TA indication may be used to determine a timing for subsequent transmissions by the communications device 270.

In accordance with embodiments of the present technique, at step S758, the communications device 270 transmits a UIPD indication 702 to the DS-TT 402. The UIPD indication 702 is based on the TA indication and indicates the one-way propagation delay applicable to transmissions by the communications device 270 to the infrastructure equipment 272.

In some embodiments, the one-way propagation delay is determined by the communications devices 270 based on the TA in accordance with known principles for the operation of the wireless access interface. For example, a predetermined timing offset between the timebases of uplink and downlink portions of the wireless access interface may be used to determine the one-way propagation delay from the a value equal to half of the indicated TA.

At step S550, the DS-TT 402 receives timing information 508 from the GM, as in the example of FIG. 5.

At step S760, the DS-TT 402 generates modified timing information 708 based on the timing information 508 and the UIPD indication 702. In some embodiments, the DS-TT 402 makes advance correction to compensate for the propagation delay on the wireless access interface that will be incurred by the timing information 708 when it is transmitted to the infrastructure equipment 272. The DS-TT 402 may also add an ingress timestamp in accordance with conventional TSN techniques.

At steps S562, S564 and S566, the modified timing information 708 is forwarded to the UPF 266 and NW-TT 262. The timing information 708 may be forwarded, for example, using the PDU session associated with the RRC connection established at steps S554 and S556. At step S564, the modified timing information 708 may be transmitted to the infrastructure equipment 272 using communication resources allocated at step S558 by the infrastructure equipment 272.

In some embodiments, the NW-TT 262 makes additional necessary corrections (for example, removing any ingress timestamp added by the DS-TT 402 and updating a compensation field) and forwards the resulting timing to destination TSN end stations (not shown in FIG. 7) which may be outside of the wireless communications network, for example in, or accessible via, the packet data network 264.

Accordingly, embodiments of the present technique can permit timing information to be modified at the ingress to the wireless communications network to compensate for propagation delays applicable to the transmission of the (modified) timing information when transmitted via a wireless access interface.

In accordance with some embodiments of the present technique, timing information generated outside of the wireless communications network and received at a first communications device for transmission via the wireless communications network is destined for recipients outside of the wireless communications network, and is transmitted to one or more such recipients via a second communications device. In accordance with some such embodiments, the timing information is modified at a DS-TT associated with the second communications device based on respective propagation delays applicable to the transmission of the timing information on a first wireless access interface from the first communications device to a first infrastructure equipment and on a second wireless access interface from a second infrastructure equipment to the second communications device.

Figure 8:
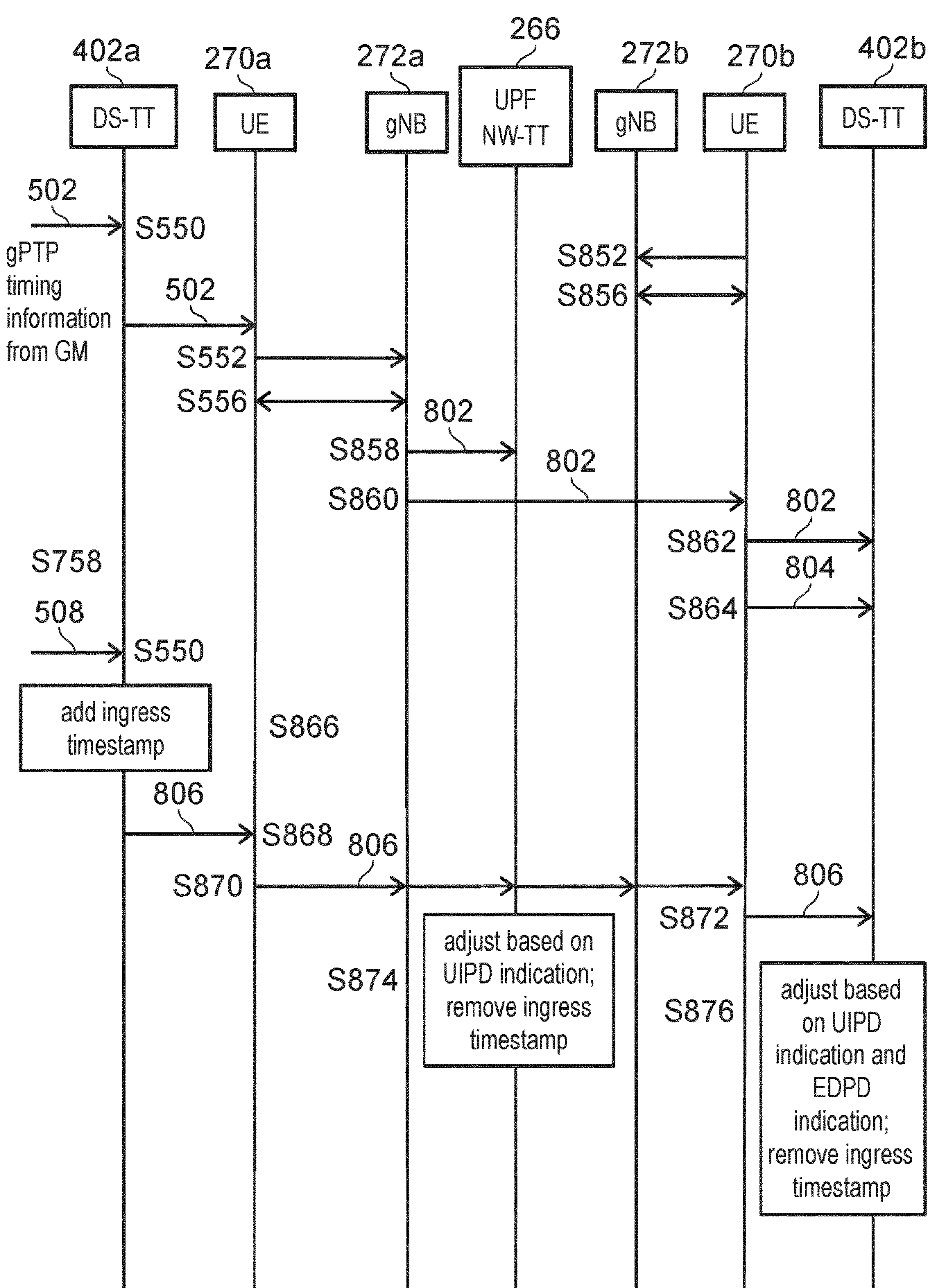
FIG. 8 illustrates a message sequence chart showing a provision of propagation delay information to time sensitive networking (TSN) translators (TT) in accordance with embodiments of the present technique.

FIG. 8 illustrates a message sequence chart showing the provision of propagation delay information to a DS-TT and/or a NW-TT in accordance with embodiments of the present technique.

In the example of FIG. 8, first and second communications devices 270*a*, 270*b* are in serving cells of the wireless communications network generated by respective first and second infrastructure equipment 272*a*, 272*b*. The first communications device 270*a* is associated with first DS-TT 402*a* which may be integrated with, or directly or indirectly connected to the first communications device 270*a*, and receives timing information from a GM clock source.

The second communications device 270*b* is associated with second DS-TT 402*b* which may be integrated with, or directly or indirectly connected to the second communications device 270*b*, and wishes to receive timing information from a GM clock source, via the wireless communications network.

The wireless communications network also comprises the UPF 266 which, in the example of FIG. 8, includes NW-TT functionality.

In some embodiments, the first and second infrastructure equipment 272*a*, 272*b* are the same. In some such embodiments, the first and second cells are the same.

In the example of FIG. 8, the first communications device 270*a* establishes a first RRC connection with the first infrastructure equipment 272*a*. This may be in accordance with conventional techniques, or may (as in FIG. 8) comprise steps S552 and S556 of the process shown in FIG. 5 and described above. The establishment of the first RRC connection may be in response to receiving timing information 502 from the DS-TT 402*a* associated with the first communications device 270*a*, and/or in response to a determination that the DS-TT 402*a* is associated with the first communications device 270*a* and provides timing information generated by a GM.

Similarly, the second communications device 270*b* establishes a second RRC connection with the second infrastructure equipment 272*b*, by transmitting at step S852 an RRC connection request message, and subsequently completing the steps for establishing the connection at step S854.

As described above in the context of the example of FIG. 7, as part of the establishment of the first and second RRC connections, a respective timing advance is determined by the infrastructure equipment 272 and indicated to the communications device 270 by the infrastructure equipment 272. The timing advance indicates a timing offset to be applied to uplink transmissions by the communications device so that the uplink transmissions arrive at the infrastructure equipment at a desired time (e.g. such that transmissions by different communications devices using communication resources which are adjacent in time do not overlap, or that the extent of any overlap is limited).

The first and second RRC connections are associated with a user plane session for the transmission of timing information from the first communications device 270*a* to the second communications device 270*b*, via the UPF 266. In the example of FIG. 8, the user plane session is also used for the transmission of the timing information to the NW-TT 262 associated with the UPF 266, so that the NW-TT 262 can forward the timing information to other recipients e.g. via the packet data network 264.

Following the establishment of the user plane session and the establishment of the first RRC connection, the first infrastructure equipment 272*a* transmits a UIPD indication 802, indicating the propagation delay applicable to uplink transmissions from the first communications device 270*a* to the first infrastructure equipment. The UIPD indication 802 is transmitted at step S858 to the UPF 266 and hence to the NW-TT 262, and at step S860 to the second communications device 270*b*.

It will be appreciated that in some embodiments, a single UIPD indication 802 may be transmitted from the first infrastructure equipment 272*a* to the UPF 266 and the UPF 266 (or NW-TT 262) subsequently forwards the UIPD indication 802 to (or towards) other TTs, such as the second DS-TT 402*a*.

In some embodiments, the first infrastructure equipment 272*a* identifies a user plane session (e.g. a PDU session) established for the transmission of the timing information from the first communications device. The first infrastructure equipment 272*a* may transmit the UIPD indication 802 in a manner such that it is associated with the identified user plane session. For example, in some embodiments, the UIPD indication 802 is transmitted within a header data packets associated with the identified user plane session. In some embodiments, the data packets may be transmitted as general packet radio service (GPRS) tunnelling protocol (GTP) packets and the UIPD indication 802 may be included within a GTP header of a packet associated with the user plane session.

At step S862, the second communications device 270*b* forwards the received UIPD indication 802 to the DS-TT 402*a*.

At step S864, the second communications device 270*b* transmits a downlink egress propagation delay (DEPD) indication 804 to the second DS-TT 402*a*. The DEPD indication 804 comprises an indication of the propagation delay applicable to the transmission of timing information on a downlink of a wireless access interface provided by the second infrastructure equipment 272*b*, and may be determined based on the timing advance applicable to the second RRC connection, which may have been determined during step S852 and/or step S856.

Subsequently, the first DS-TT 402*a* receives timing information 508 from the GM. The timing information may be for example in the form of a gPTP packet.

At step S866, the first DS-TT 402*a* may process the received timing information 508 in a conventional manner, for example by adding an ingress timestamp. The first DS-TT 402*a* thus forms first modified timing information 806 for distribution within the wireless communications networks to other TTs at the edge of the wireless communications network, such as the NW-TT 262 and the second DS-TT 402*b*. The first modified timing information 806 is passed to the first communications device 270*a* at step S868.

At step S870, the first modified timing information 806 is forwarded from the first communications device 270*a* via the user plane session to the UPF 266 (and hence to the NW-TT 262) and to the second communications device 270*b*. At step S872, the first modified timing information 806 is forwarded from the second communications device 270*b* to the second DS-TT 402*b*.

At step S874, the NW-TT 262 processes the first modified timing information 806 to form second modified timing information (not shown in FIG. 8) for distribution to one or more timing information recipients such as within (or reachable via) the packet data network 264. The second modified timing information is determined based on the first modified timing information and on the UIPD indication 802. For example, the second modified timing information may be formed by removing from the first modified timing information the ingress timestamp and updating the time or compensation field based on the UIPD indication 802.

The second modified timing information is then forwarded, via the packet data network 264 to timing information recipients.

At step S876, the second DS-TT 402*b* processes the first modified timing information 806 to form third modified timing information (not shown in FIG. 8) for distribution to other timing information recipients reachable via the second DS-TT 402*b*. The third modified timing information is determined based on the first modified timing information, the UIPD indication 802 and the EDPD indication 804.

For example, the third modified timing information may be formed by removing from the first modified timing information the ingress timestamp and updating the time or compensation field based on the UIPD indication 802 and the EDPD indication 804.

The third modified timing information is then forwarded to one or more timing information recipients by the second DS-TT 402*b*.

Accordingly, embodiments of the present technique can provide timing information which has traversed a wireless communications network and has been updated to account for propagation delays incurred on an uplink and/or a downlink of wireless access interfaces used for the transmission of the timing information through the wireless communications network.

Embodiments of the present technique can provide for the transmission via the wireless communications network of timing information, when that transmission comprises transmission via a sidelink connecting a first communications device and a second communications device.

Figure 9:
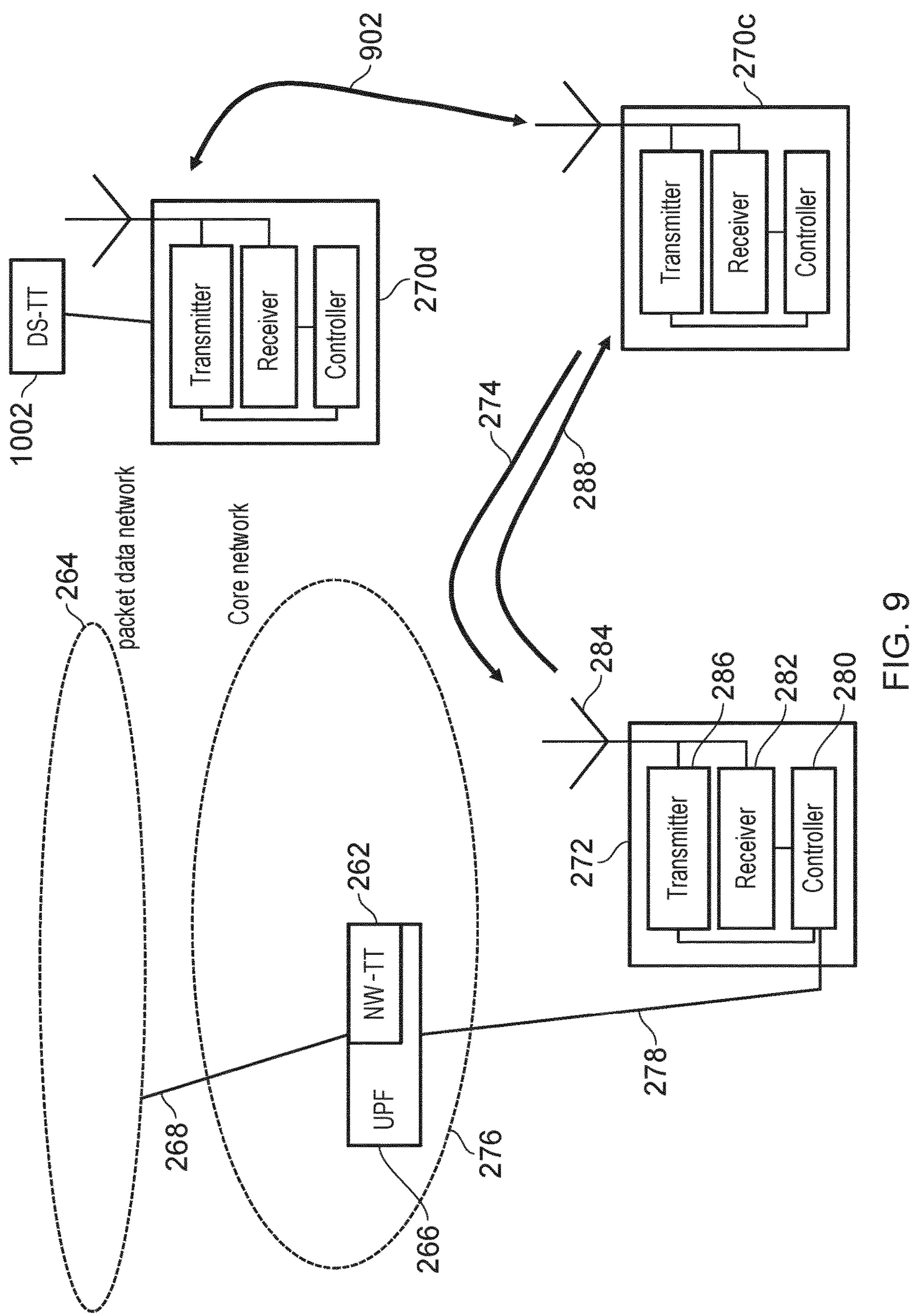
FIG. 9 shows an example network scenario including a sidelink, which may be adapted in accordance with embodiments of the present technique.

FIG. 9 shows an example network scenario including a sidelink.

Many elements of FIG. 9 correspond to like-numbered elements in FIG. 3 and their description is omitted here for conciseness.

In FIG. 9, the infrastructure equipment 272 provides service, via the wireless access interface comprising the uplink 274 and the downlink 288, to a relay communications device 270*c*. The relay communications device 270*c* provides service, via a sidelink 902, to a remote communications device 270*d*. Associated with the remote communications device 270*d* is a DS-TT 1002

The sidelink 902 may comprise a wireless access interface operated in accordance with known device-to-device techniques. For example, the sidelink 902 may be operated in accordance with specifications for a 3GPP PC-5 interface.

Figure 10:
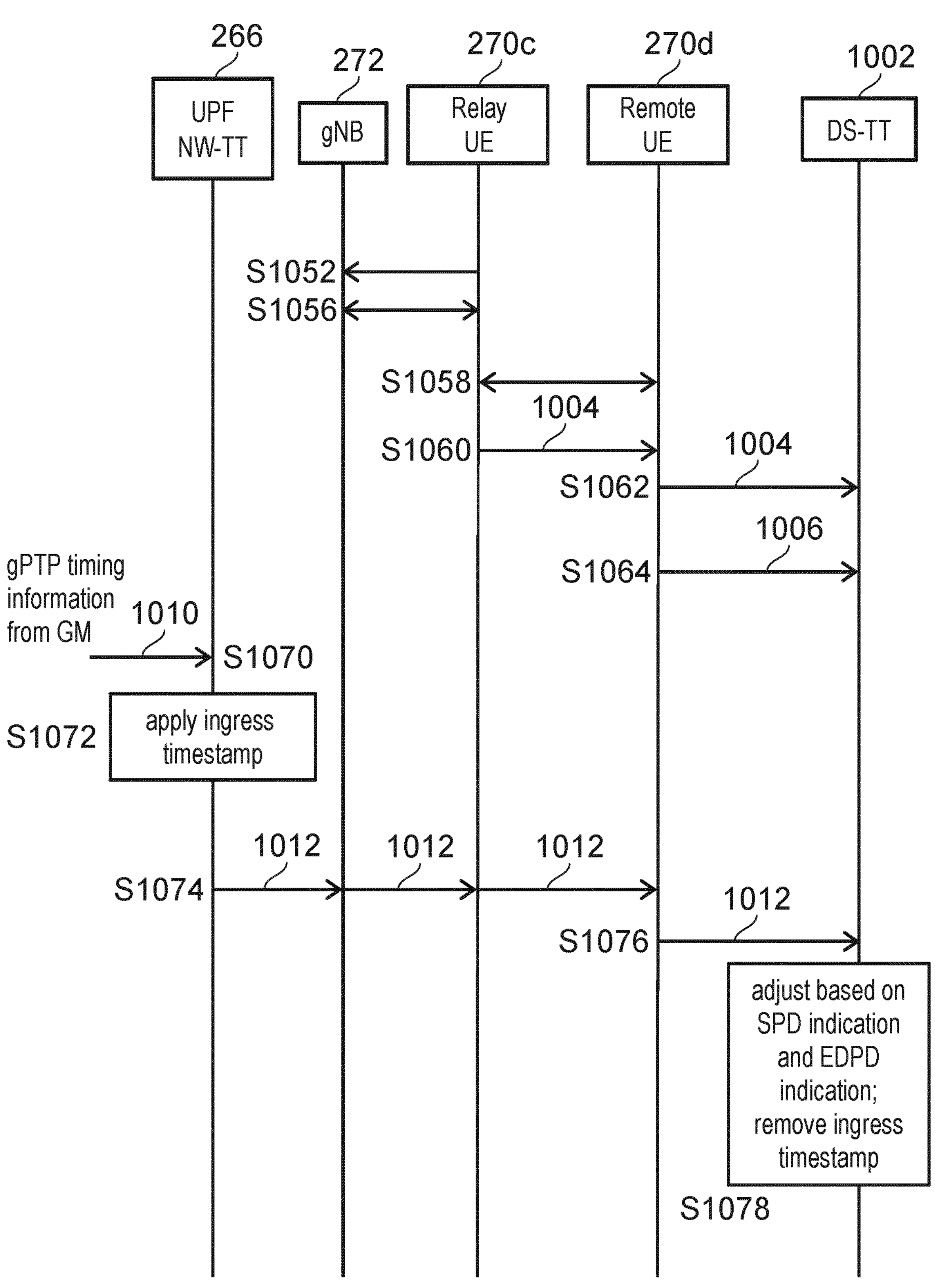
FIG. 10 is a message sequence chart for adjustment of timing information in accordance with embodiments of the present technique, when the transmission via the wireless communications network of timing information comprises a transmission via a sidelink.

FIG. 10 shows a message sequence chart for adjustment of timing information in accordance with embodiments of the present technique, when the transmission via the wireless communications network of timing information comprises transmission via a sidelink.

The relay communications device 270*c* obtains services of the wireless communications network via the infrastructure equipment 272, and the remote communications device 270*d* obtains services of the wireless communications network via the relay communications device 270*c* via the sidelink 902, as shown in FIG. 9.

At steps S1052 and S1056, the relay communications device 270*c* establishes an RRC connection with the infrastructure equipment 272. As part of the establishment of the RRC connection, a timing advance for use in scheduling uplink transmissions by the relay communications device 270*c* is determined and indicated to the relay communications device 270*c*.

At step S1058, a propagation delay applicable to transmissions via the sidelink 902 is determined by the remote communications device 270*c*. This may be in accordance with conventional techniques, such as those used for the determination of a device-to-device timing advance for remote communications devices. This may be based on measuring relative timing between transmissions by the remote communications device 270*d* to the relay communications device 270*c*, and transmissions by the relay communications device 270*c* to the remote communications device 270*d*.

At step S1060, the relay communications device 270*c* transmits an EDPD indication 1004 to the remote communications device 270*d*. The EDPD indication 1004 may be transmitted within an RRC Reconfiguration message. At step S1062, the remote communications device 270*c* forwards the EDPD indication 1004 to the DS-TT 1002. The EDPD indication 1004 may be substantially the same as the EDPD indication 804 described above in the context of the example illustrated in FIG. 8.

The DS-TT 1002 thus determines the downlink propagation delay applicable to transmissions of timing information from the infrastructure equipment 272 to the relay communications device 270*c*.

At step S1064, the remote communications device 270*d* transmits a sidelink propagation delay (SPD) indication 1006 to the DS-TT 1002. The SPD indication 1006 comprises an indication of the one-way delay applicable to transmissions between the relay communications device 270*c* and the remote communications device 270*d*.

The DS-TT 1002 thus determines the propagation delay applicable to transmissions of timing information from the relay communications device 270*c* to the remote communications device 270*d*.

In some embodiments, step S1064 is preceded by a transmission of the SPD indication 1006 by the relay communications device 270*c* to the remote communications device 270*d*. This may permit the remote communications device 270*c* to determine the sidelink propagation delay, if it is not otherwise made available to the remote communications device 270*c* as part of step S1058.

In some embodiments, the DS-TT 1002 receives a combined propagation delay (CPD) indication instead of the SPD indication 1006 and the EDPD indication 1004. The CPD indication indicates the sum of all propagation delays incurred by transmissions of timing information from the infrastructure equipment 272 to the remote communications device 270*d* via the relay communications device 270*c*. The CPD indication may be generated by the remote communications device 270*d* based on the EDPD indication 1004 and the sidelink propagation delay.

At step S1070, the NW-TT 262 at the UPF 266 receives timing information 1010 from the GM clock, via the packet data network 264.

At step S1072, the NW-TT 262 may process the timing information 1010 in accordance with conventional procedures for an ingress TT, to generate first modified timing information 1012. For example, the NW-TT 262 may apply an ingress timestamp.

At step S1074, the modified timing information 1012 is forwarded, via a PDU session established for the purpose of distribution of timing information within the wireless communications network, to the remote communications device 270*d*. As part of step S1074, the modified timing information 1012 is forwarded from the infrastructure equipment 272 to the relay communications device 270*c*, and thence to the remote communications device 270*d*.

At step S1076, the remote communications device 270*d* forwards the modified timing information 1012 to the DS-TT 1002.

At step S1078, the DS-TT 1002 processes the modified timing information 1012 to form second modified timing information (not shown in FIG. 10) for distribution to other timing information recipients reachable via the DS-TT 1002. The second modified timing information is determined based on the modified timing information 1012, the SPD indication 1006 and the EDPD indication 1004 (or a combined indication, as described above). For example, the second modified timing information may be formed by removing from the modified timing information the ingress timestamp and updating the time or compensation field based on the SPD indication 1006 and the EDPD indication 1004.

The second modified timing information is then forwarded to one or more timing information recipients (not shown in FIG. 10) by the DS-TT 1002.

Accordingly, embodiments of the present technique can provide timing information which has traversed a wireless communications network and has been updated to account for propagation delays incurred on both a wireless access interface provided by an infrastructure equipment, and a sidelink between a remote communications device and a relay communications device.

In the example of FIG. 10, the DS-TT associated with the relay acted as the egress from the wireless communications network for the timing information.

Embodiments of the present technique can also provide for the adjustment of timing information received at a DS-TT which is associated with a relay communications device.

Figure 11:
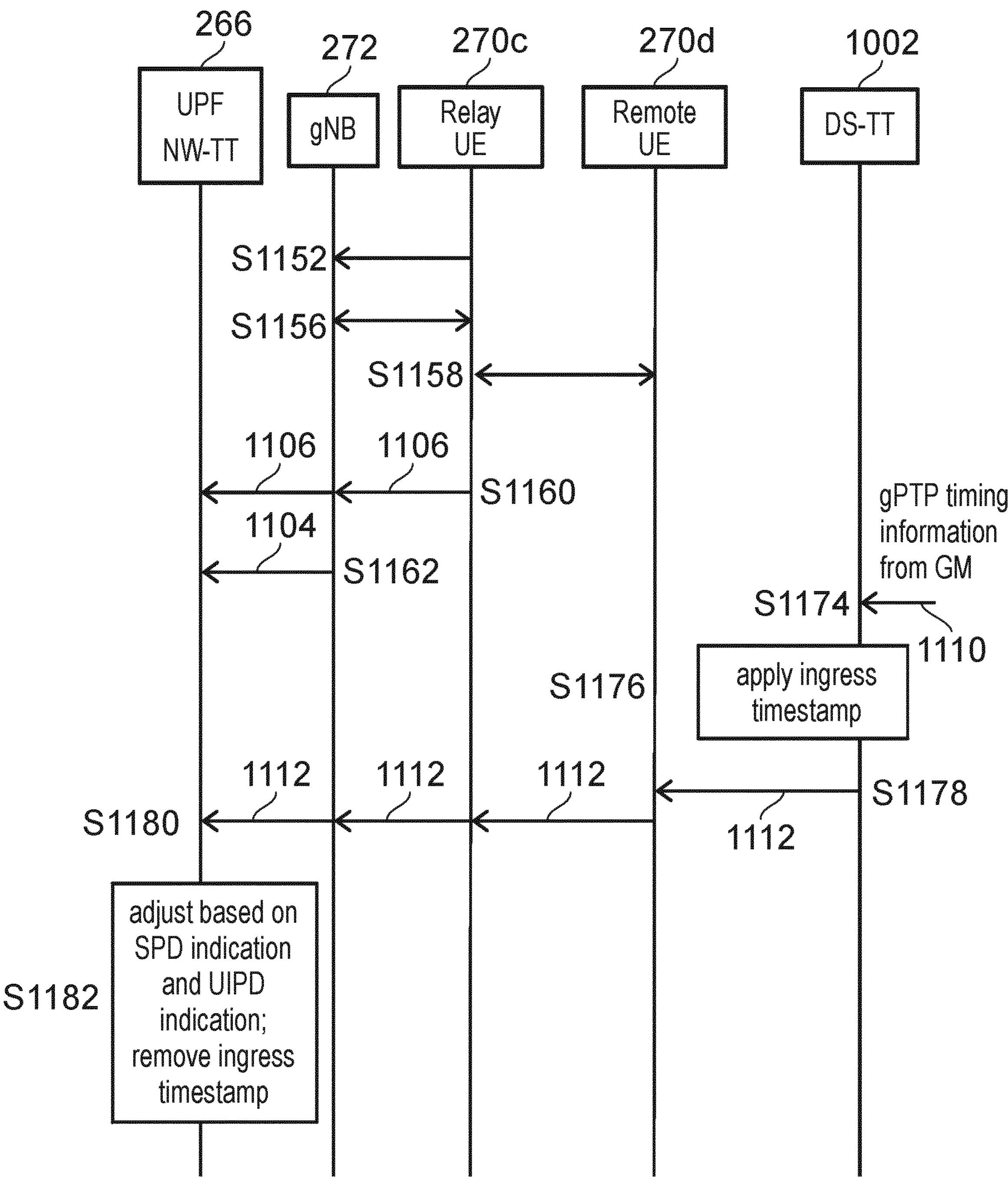
FIG. 11 is a message sequence chart for adjustment of timing information in accordance with embodiments of the present technique, when the transmission via the wireless communications network of timing information comprises a transmission via a sidelink, and a remote communications device is associated with a source of timing information.

FIG. 11 shows a message sequence chart for adjustment of timing information in accordance with embodiments of the present technique, when the transmission via the wireless communications network of timing information comprises transmission via a sidelink, and a remote communications device is associated with a source of timing information (e.g. acts as an ingress node to the wireless communications network).

The entities in FIG. 11 are substantially the same as those shown in FIG. 10 and described above.

In the example of FIG. 11, the DS-TT 1002 associated with the remote communications device 270*d* receives timing information from a GM (not shown). Accordingly, the DS-TT 1002 acts as the ingress to the wireless communications network for the timing information.

In the example of FIG. 11, recipients for the timing information are in, or reachable via, the packet data network 264. The NW-TT 262 associated with the UPF 266 accordingly acts as the egress for the timing information.

In the example of FIG. 11, as in FIG. 10, the relay communications device 270*c* obtains services of the wireless communications network via the infrastructure equipment 272, and the remote communications device 270*d* obtains services of the wireless communications network via the relay communications device 270*c* via the sidelink 902.

At steps S1152 and S1154, the relay communications device 270*c* establishes an RRC connection with the infrastructure equipment 272. As part of the establishment of the RRC connection, a timing advance for use in scheduling uplink transmissions by the relay communications device 270*c* is determined by the infrastructure equipment 272.

Step S1158 corresponds substantially to step S1058 of the example of FIG. 10, as a result of which, the relay communications device 270*c* determines a propagation delay applicable to transmissions via the sidelink 902 is determined.

At step S1160, the relay communications device 270*c* transmits an ingress sidelink propagation delay (ISPD) indication 1106 to the infrastructure equipment 272. The infrastructure equipment 272 then forwards the ISPD indication 1106 to the UPF 266 and hence to the NW-TT 262. The ISPD indication 1106 indicates the propagation delay applicable to transmissions via the sidelink 902 determined at step S1158.

At step S1162, the infrastructure equipment 272 transmits an UIPD indication 1104 to the NW-TT 262. As in the example of FIG. 8, the UIPD indication 1104 indicates the propagation delay applicable to uplink transmissions from a communications device (in the example of FIG. 11, the relay communications device 270*c*) to infrastructure equipment (in the example of FIG. 11, the infrastructure equipment 272).

The transmissions of the ISPD indication 1106 and the UIPD indication 1104 by the infrastructure equipment 272 may be by means of inclusion of the ISPD indication 1106 and the UIPD indication 1104 in one or more headers (e.g. GTP headers) of packets associated with a user plane session established for the transmission of the timing information.

Subsequently, at step S1174, the DS-TT 1002 receives timing information 1110, which may be a gPTP packet, from the GM source (directly or otherwise). At step S1176, the DS-TT 1002 applies any applicable inbound processing, such as adding an ingress timestamp, to generate modified timing information 1112.

At step S1178, the DS-TT 1002 forwards the modified timing information 1112 to the remote communications device 270*d*.

At step S1180, the remote communications device 270*d* forwards the modified timing information 1112 via a PDU session, established for the purpose of transmitting timing information within the wireless communications network, to the UPF 266 and NW-TT 262.

At step S1182, the NW-TT 262 processes the modified timing information 1112 to form second modified timing information (not shown in FIG. 11) for distribution to other timing information recipients reachable via the packet data network 264. The second modified timing information is determined based on the modified timing information 1112, the SPD indication 1106 and the EDPD indication 1104 (or a combined indication, as described above). For example, the second modified timing information may be formed by removing from the modified timing information the ingress timestamp and updating the time or compensation field based on the SPD indication 1106 and the EDPD indication 1104.

The second modified timing information is then forwarded to one or more timing information recipients (not shown in FIG. 11) by the NW-TT 262.

Accordingly, embodiments of the present technique can provide timing information which has traversed a wireless communications network and has been updated to account for propagation delays incurred on both a wireless access interface provided by an infrastructure equipment, and a sidelink between a remote communications device and a relay communications device.

In accordance with some embodiments of the present technique, one or more steps of the processes illustrated in FIG. 10 and FIG. 11 may be repeated. In particular, step S1058 of the process of FIG. 10 and step S1158 of the process of FIG. 11 may be repeated, e.g. periodically, or based on changes in the results of channel measurements. If the result is determined to be different from that previously reported (e.g. in step S1064 or step S1160) by more than a predetermined amount (which may be zero, in some embodiments), then step S1064 or step S1164 may be repeated based on the newly determined propagation delay.

Similarly, in some embodiments, the step of determining the propagation delay between the infrastructure equipment 272 and the relay communications device 270*c* may be repeated and, if the result is found to differ by some amount from that previously reported to the DS-TT or NW-TT, then the reporting step(s) (steps S1060 and S1062 in the process of FIG. 10; step S1162 in the process of FIG. 11) may be repeated.

In some embodiments, the logical topology of the network may change such that the remote communications device 270*c* no longer obtains service of the wireless communications device via the combination of the relay communications device 270*c* and the infrastructure equipment 272. For example, the relay communications device 270*c* may perform a handover to a different infrastructure equipment and/or the remote communications device 270*d* may establish a sidelink with a different relay communications device.

In response to a determination of such a change in topology, steps of the process illustrated in FIG. 10 or FIG. 11 may be repeated, so that the DS-TT (FIG. 10) or NW-TT (FIG. 11) are made aware of the propagation delays applicable in the new logical topology.

For example, in response to determining, by the infrastructure equipment 272, that the propagation delay applicable to transmissions from the relay communications device 270*c* to the infrastructure equipment 272 when the remote communications device 270*d* is associated with the DS-TT 1002 acting as an ingress entity, then step S1162 in the example of FIG. 11 may be repeated. When the remote communications device 270*d* is associated with the DS-TT 1002 acting as an ingress entity, then step S1060 of the sequence of FIG. 10 may be repeated.

Similarly, if the remote communications device 270*d* changes its relay, to another 'new' relay communications device, then the new relay communications device may transmit an indication to the infrastructure equipment serving the new relay communications device.

The present disclosure is not limited to the above specific examples and it will be appreciated that corresponding indications may be generated by respective entities in response to a determination of change of logical topology and/or of change of propagation delay.

A remote communications device, such as the remote communications device 270*d* of FIG. 9, may establish a sidelink with a second remote communications device.

Figure 12:
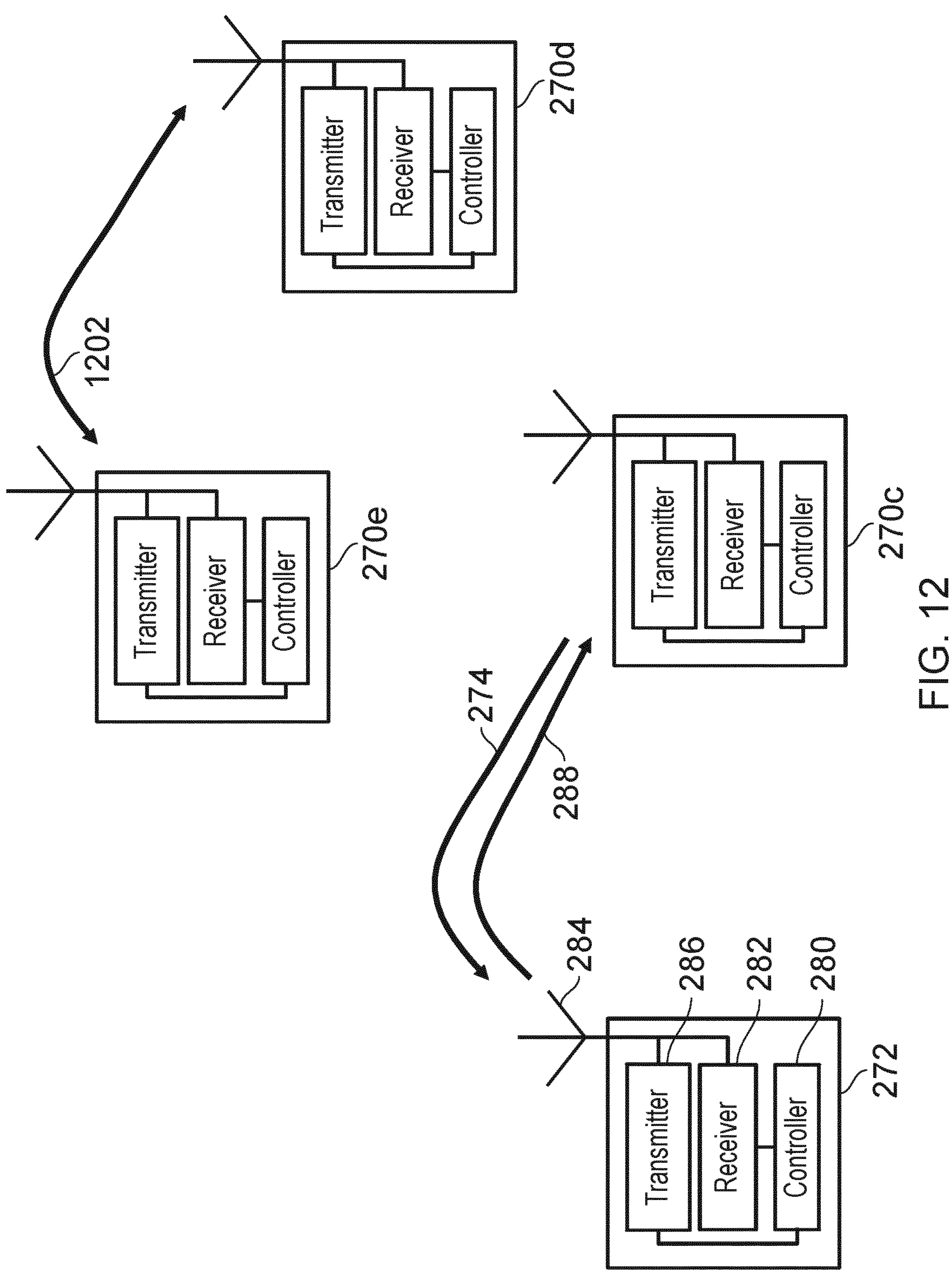
FIG. 12 shows two remote communications devices which may be configured to communicate via a sidelink in accordance with embodiments of the present technique.

FIG. 12 shows two remote communications devices communicating via a sidelink. In the example of FIG. 12, initially the first remote communications device 270*d* and second communications device 270*e* communicate via a sidelink 1202. For conciseness, infrastructure equipment and the core network of the wireless communications network, other than the infrastructure equipment 272, is omitted from FIG. 12.

The first remote communications device 270*d* may require timing information, which it receives from the second communications device 270*e*. However, the timing information (which may be timing information generated in accordance with a 3GPP 5G timing information specification) is generated by the second remote communications device 270*e*, and not by any infrastructure equipment or other entity within the wireless communications network.

Figure 13:
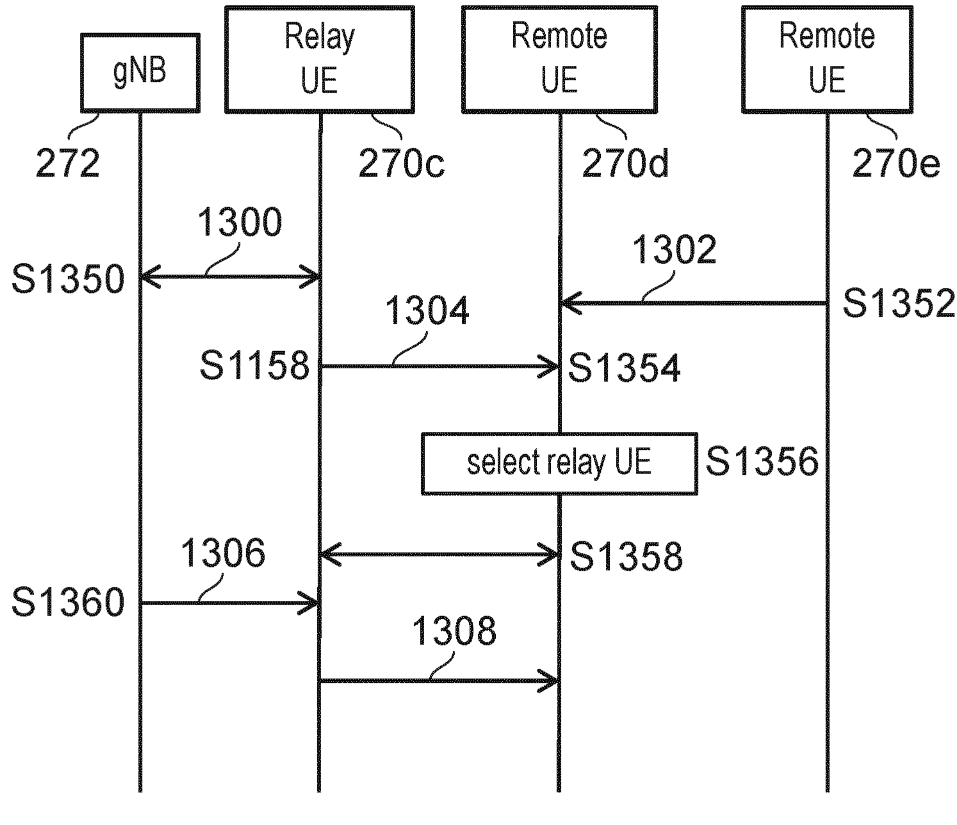
FIG. 13 is a message sequence chart illustrating messages and processes for the selection of a relay communications device by a remote communications device, in accordance with embodiments of the present technique.

FIG. 13 shows a message sequence chart illustrating messages and processes for the selection of a relay communications device by a remote communications device, in accordance with embodiments of the present technique.

Initially, the relay communications device 270*c* has established an RRC connection 1300 with the infrastructure equipment 272, at step S1350.

In accordance with some embodiments of the present technique, at step S1352 the first remote communications device 270*d* initially receives timing information 1302 from the second remote communications device 270*e* via the sidelink 1202.

In such embodiments, the timing information may be 5GS timing information—that is, timing information generated by an entity within the scope of 3GPP 5G specifications, having as its intended scope a wireless communications network such as a 5G wireless communications network. As such, for example, in some embodiments the timing information is not timing information in compliance with IEEE 802.1AS. However, it will be appreciated that the timing information may in some embodiments be any suitable timing information.

At step S1354, the first remote communications device may detect the presence of the relay communications device 270*c*. For example, the first remote communications device 270*d* may receive discovery signals 1304 transmitted by the relay communications device 270*c*, or other signals which indicate that the relay communications device 270*c* is able to act as a relay and to provide access to services of the wireless communications network via an infrastructure equipment.

At step S1356, the first remote communications device 270*d* may, in response to detecting the relay communications device 270*c*, may select the relay communications device 270*c* as the communications device from which it obtains timing information.

Accordingly, at step S1358, the first remote communications device 270*d* may establish a sidelink connection with the relay communications device 270*c*.

At step S1360, the infrastructure equipment 272 transmits timing information 1306 to the relay communications device 270*c*. The timing information may be, for example, a time indication within system information (such as system information block 9).

At step S1362, the relay communications device 270*c* transmits timing information 1308 to the first remote communications device 270*d*. The second timing information 1308 is based on the timing information 1306 transmitted at step S1360. For example, the second timing information 1308 may be the same as the timing information 1306 transmitted at step S1360, or may be adjusted, for example based on a propagation delay incurred in the transmission of the first timing information 1306 and/or in the transmission of the second timing information 1308. The propagation delays may be determined in accordance with any of the examples presented elsewhere in the present disclosure, or in accordance with any other suitable known technique.

Accordingly, the first remote communications device 270*d* can obtain a more reliable source of timing information which allows it to be synchronised with a large number of devices within the wireless communications network.

In the examples above, terminology associated with the timing distribution scheme specified in the IEEE 802.1AS specification is used. However, it will be appreciated that the scope of the present technique is not limited to such timing distribution techniques, and accordingly the use of such terminology is for simplicity. That is to say, the use of a specific term in relation to certain example implementations is not intended to indicate these implementations are limited to a certain timing distribution scheme or specification that may be most associated with that particular terminology.

In various examples described above, the DS-TT 402 receives timing information from a GM. In accordance with some embodiments of the present technique, the DS-TT 402 may instead function as a GM responsible for generating timing information for distribution to other entities. In such embodiments, instead of modifying received timing information (as described in the examples above), the DS-TT 402 generates adapted timing information in accordance with the examples described above. For example, with reference to the example illustrated in FIG. 7, the DS-TT 402 may generate timing information 708 directly, taking into account the propagation delay application on the wireless access interface, as indicated by the UIPD indication 702.

The present disclosure is not limited to the specific combinations of features disclosed in respect of the various examples described above. In some embodiments, aspects of the examples may be combined in different ways. Similarly, in some embodiments, steps in the described examples may be omitted, combined, or re-ordered.

Accordingly, embodiments of the present technique can provide a method of operating a communications device in a wireless communications network, the method comprising: transmitting to an infrastructure equipment of the wireless communications network a time source indication, the time source indication indicating to the infrastructure equipment that the communications device is a source of timing information.

There has also been disclosed a method of operating a wireless communications network, the method comprising determining a propagation delay of a transmission of a signal transmitted by a first entity in the wireless communications network to a second entity in the wireless communications network, transmitting a propagation delay indication to a timing information ingress entity or a timing information egress entity, the propagation delay indication based on the determined propagation delay, receiving at the wireless communications network timing information at the timing information ingress entity, and transmitting the timing information via the first entity and the second entity to the timing information egress entity.

There has also been disclosed a method of operating a communications device in a wireless communications network, the method comprising establishing a connection via a wireless access interface of a serving cell with an infrastructure equipment of the wireless communications network, transmitting, via the connection, timing information, measuring a propagation delay associated with signals transmitted in a candidate cell, and transmitting to the infrastructure equipment a measurement report comprising an indication of the propagation delay.

There has also been disclosed a method for operating a first communications device, the method comprising receiving timing information generated by a second communications device via a sidelink connection with the second communications device, determining that a third communications device can act as a relay communications device and provide access to services via a wireless access interface provided by an infrastructure equipment, in response to determining that the third communications device can act as a relay communications device, establishing a second sidelink connection with the third communications device, and receiving timing information from the infrastructure equipment via the third communications device acting the relay communications device.

Corresponding apparatus, communications devices, infrastructure equipment and circuitry have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device.

It will further be appreciated that the principles described herein are applicable not only to LTE-based or 5G/NR-based wireless telecommunications systems, but are applicable for any type of wireless telecommunications system that supports the transmission of timing information.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device in a wireless communications network, the method comprising: transmitting to an infrastructure equipment of the wireless communications network a time source indication, the time source indication indicating to the infrastructure equipment that the communications device is a source of timing information.

Paragraph 2. A method according to paragraph 1, wherein the communications device comprises a clock for generating timing information, the method comprising generating timing information.

Paragraph 3. A method according to paragraph 1, the method comprising receiving the timing information.

Paragraph 4. A method according to paragraph 2 or paragraph 3, the method comprising receiving an indication of an allocation of uplink communication resources from the infrastructure equipment, and transmitting to the infrastructure equipment, using the allocated uplink communication resources, the timing information.

Paragraph 5. A method according to any of paragraphs 1 to 4, wherein transmitting to the infrastructure equipment the time source indication comprises transmitting a radio resource control (RRC) setup complete message comprising the time source indication.

Paragraph 6. A method according to any of paragraphs 1 to 4, wherein transmitting to the infrastructure equipment the time source indication comprises transmitting a radio resource control (RRC) reconfiguration complete message comprising the time source indication.

Paragraph 7. A method of operating an infrastructure equipment in a wireless communications network, the infrastructure equipment providing a wireless access interface for transmitting data to and receiving data from a communications device, the method comprising: receiving a time source indication, the time source indication indicating to the infrastructure equipment that the communications device is acting as a source of timing information.

Paragraph 8. A method according to paragraph 7, wherein the time source indication is received via the wireless access interface from the communications device.

Paragraph 9. A method according to paragraph 7, wherein the time source indication is received from a core network entity of the wireless communications network.

Paragraph 10. A method according to any of paragraphs 7 to 9, the method comprising in response to receiving the time source indication, maintaining in an active state a radio resource control (RRC) connection with the communications device until either a request to release the RRC connection is received from the communications device or the infrastructure equipment determines that a serving cell of the communications device should be changed, and allocating uplink communication resources for the transmission of the timing information by the communications device.

Paragraph 11. A method of any of paragraphs 7 to 10, wherein the wireless access interface is provided in a first cell, the method comprising determining that a serving cell of the communications device should be changed to a second cell based on a propagation delay in the first cell and a propagation delay in the second cell, and in response to the determining that the serving cell of the communications device should be changed to the second cell and receiving the time source indication, initiating a handover of the communications device from the first cell to the second cell.

Paragraph 12. A method according to paragraph 11, wherein the determining that a serving cell of the communications device should be changed to a second cell comprises determining that the propagation delay in the second cell is lower than the propagation delay in the first cell.

Paragraph 13. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to transmit to the infrastructure equipment a time source indication, the time source indication indicating to the infrastructure equipment that the communications device is a source of timing information.

Paragraph 14. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to transmit to the infrastructure equipment a time source indication, the time source indication indicating to the infrastructure equipment that the communications device is a source of timing information.

Paragraph 15. Infrastructure equipment for use in a wireless communications network, the infrastructure equipment providing a wireless access interface for communicating with a communications device in a cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to receive a time source indication, the time source indication indicating to the infrastructure equipment that the communications device is acting as a source of timing information.

Paragraph 16. Circuitry for an infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to receive a time source indication, the time source indication indicating to the infrastructure equipment that the communications device is acting as a source of timing information.

Paragraph 17. A method of operating a wireless communications network, the method comprising determining a propagation delay of a transmission of a signal transmitted by a first entity in the wireless communications network to a second entity in the wireless communications network, transmitting a propagation delay indication to a timing information ingress entity or a timing information egress entity, the propagation delay indication based on the determined propagation delay, receiving at the wireless communications network timing information at the timing information ingress entity, and transmitting the timing information via the first entity and the second entity to the timing information egress entity.

Paragraph 18. A method according to paragraph 17, wherein the signal is transmitted over a wireless access interface provided by an infrastructure equipment of the wireless communications network.

Paragraph 19. A method according to paragraph 18, wherein determining the propagation delay of the transmission of the signal comprises receiving a transmission by a communications device on a random access channel, determining a timing advance for use by the communications device for uplink transmissions on the wireless access interface.

Paragraph 20. A method according to paragraph 18 or paragraph 19, wherein the first entity is a communications device, and the second entity is the infrastructure equipment.

Paragraph 21. A method according to paragraph 18 or paragraph 19, wherein the first entity is the infrastructure equipment, and the second entity is a communications device.

Paragraph 22. A method according to any of paragraphs 17 to 21, wherein the timing information ingress entity is a device-side time synchronised network (TSN) translator (DS-TT) associated with a communications device, the communications device being one of the first entity and the second entity.

Paragraph 23. A method according to paragraph 22, wherein the timing information device-side time synchronised network (TSN) translator (DS-TT) is connected to the communications device.

Paragraph 24. A method according to paragraph 22, wherein the communications device comprises the device-side time synchronised network (TSN) translator (DS-TT).

Paragraph 25. A method according to any of paragraphs 17 to 21, wherein the timing information ingress entity is a network TSN translator (NW-TT) associated with a user plane function within a core network portion of the wireless communications network.

Paragraph 26. A method according to any of paragraphs 17 to 25, wherein the timing information egress entity is a device-side time synchronised network (TSN) translator (DS-TT) associated with a communications device.

Paragraph 27. A method according to any of paragraphs 17 to 26, wherein the indication of the propagation delay is transmitted to the timing information egress entity, the method comprising determining a second propagation delay of a transmission of a signal over a second wireless access interface provided by a second infrastructure equipment of the wireless communications network, transmitting an indication of the second propagation delay to the timing information egress entity, wherein transmitting the timing information via the wireless access interface to the timing information egress entity comprises transmitting the timing information via the second wireless access interface.

Paragraph 28. A method according to any of paragraphs 17 to 27, wherein the indication of the propagation delay is transmitted to the timing information egress entity, the method comprising receiving, by the timing information egress entity, the timing information transmitted via the wireless access interface, adjusting, by the timing information egress entity, the timing information based on the indicated propagation delay to generate modified timing information for transmitting to timing information recipients outside of the wireless communications network.

Paragraph 29. A method according to any of paragraphs 17 to 26, wherein the indication of the propagation delay is transmitted to the timing information ingress entity, the method comprising receiving, at the timing information ingress entity, timing information based on a grand master timing source, adjusting, by the timing information ingress entity, the received timing information based on the indicated propagation delay to generate the timing information for transmitting via the wireless access interface to the timing information egress entity.

Paragraph 30. A method according to paragraph 17 wherein the first entity and the second entity are communications devices, one of the first entity and the second entity acting as a relay communications device providing service via a sidelink to the other one of the first entity and the second entity acting as a remote communications device, the relay communications device obtaining service from an infrastructure equipment providing a wireless access interface.

Paragraph 31. A method according to paragraph 30, wherein the remote communications device is associated with a DS-TT.

Paragraph 32. A method according to paragraph 30 or paragraph 31, the method comprising determining that the propagation delay has changed by more than a predetermined amount, and in response to determining that the propagation delay has changed by more than a predetermined amount, transmitting a second propagation delay indication to the timing information ingress entity or the timing information egress entity, the second propagation delay indication based on the changed propagation delay.

Paragraph 33. A method according to any of paragraphs 30 to 32, the method comprising determining that the remote communications device is obtaining service via a sidelink to a different relay communications device, and in response to determining that the remote communications device is obtaining service via a sidelink to the different relay communications device, determining a third propagation delay of a transmission of a signal transmitted by the different relay communications device and the remote communications device, and transmitting a third propagation delay indication based on the third propagation delay.

Paragraph 34. A method according to any of paragraphs 30 to 32, the method comprising determining a fourth propagation delay of a transmission of a signal transmitted between the infrastructure equipment and the relay communications device.

Paragraph 35. A method according to paragraph 34, the method comprising transmitting a fourth propagation delay indication to the timing information ingress entity or the timing information egress entity.

Paragraph 36. A method according to paragraph 34, wherein the propagation delay indication is based on the fourth propagation delay.

Paragraph 37. Apparatus for operating in a wireless communications network, the apparatus comprising a transmitter configured to transmit signals via a wireless access interface provided by an infrastructure equipment of the wireless communications network, a receiver configured to receive signals via the wireless access interface, and a controller configured to control the transmitter and the receiver so that the apparatus is operable to determine a propagation delay of a transmission of a signal transmitted via the wireless access interface, to transmit a propagation delay indication to a timing information ingress entity or a timing information egress entity, the propagation delay indication based on the determined propagation delay, to receive timing information received at the wireless communications network at the timing information ingress entity, and to transmit the timing information via the wireless access interface.

Paragraph 38. Apparatus according to paragraph 37, wherein the apparatus is an infrastructure equipment of the wireless communications network, and the apparatus provides the wireless access interface.

Paragraph 39. Apparatus according to paragraph 37, wherein the apparatus is a communications device.

Paragraph 40. Apparatus according to paragraph 39, wherein the apparatus is associated with the timing information ingress entity or the timing information egress entity.

Paragraph 41. Apparatus for operating in a wireless communications network, the apparatus comprising a transmitter configured to transmit signals via a sidelink provided by a relay communications device of the wireless communications network, the relay communications device obtaining service from an infrastructure equipment providing a wireless access interface, a receiver configured to receive signals via the sidelink, and a controller configured to control the transmitter and the receiver so that the apparatus is operable to determine a propagation delay of a transmission of a signal transmitted via the sidelink, and to transmit a propagation delay indication to a timing information ingress entity or a timing information egress entity, the propagation delay indication based on the determined propagation delay.

Paragraph 42. Apparatus according to paragraph 41, wherein the controller configured to control the transmitter and the receiver so that the apparatus is operable to receive timing information received at the wireless communications network at the timing information ingress entity, and to transmit the timing information via the wireless access interface.

Paragraph 43. Apparatus according to paragraph 41 or paragraph 42, wherein the apparatus is the relay communications device.

Paragraph 44. Apparatus according to paragraph 41 or paragraph 42, wherein the apparatus is a remote communications device.

Paragraph 45. Apparatus according to paragraph 44, wherein the apparatus is associated with the timing information ingress entity or the timing information egress entity.

Paragraph 46. Apparatus according to paragraph 41 or paragraph 42, wherein the apparatus is the infrastructure equipment.

Paragraph 47. Circuitry for apparatus for operating in a wireless communications network, the circuitry comprising transmitter circuitry configured to transmit signals via a wireless access interface provided by an infrastructure equipment of the wireless communications network, receiver circuitry configured to receive signals via the wireless access interface, and controller circuitry configured to control the transmitter circuitry and the receiver circuitry so that the apparatus is operable to determine a propagation delay of a transmission of a signal transmitted via the wireless access interface, to transmit a propagation delay indication to a timing information ingress entity or a timing information egress entity, the propagation delay indication based on the determined propagation delay, to receive timing information received at the wireless communications network at the timing information ingress entity, and to transmit the timing information via the wireless access interface.

Paragraph 48. Apparatus for operating in a wireless communications network, the apparatus comprising transmitter circuitry configured to transmit signals via a sidelink provided by a relay communications device of the wireless communications network, the relay communications device obtaining service from an infrastructure equipment providing a wireless access interface, receiver circuitry configured to receive signals via the sidelink, and controller circuitry configured to control the transmitter circuitry and the receiver circuitry so that the apparatus is operable to determine a propagation delay of a transmission of a signal transmitted via the sidelink, and to transmit a propagation delay indication to a timing information ingress entity or a timing information egress entity, the propagation delay indication based on the determined propagation delay.

Paragraph 49. Apparatus for operating as a timing information ingress entity for a wireless communications network, the apparatus comprising memory and a processor, the memory having stored thereon computer readable instructions, which when executed, cause the apparatus to perform the operations of: receiving timing information for transmission via the wireless communications network to a timing information egress entity, receiving a propagation delay indication indicating a propagation delay of a signal transmitted via a wireless access interface and/or a sidelink of the wireless communications network, adjusting the received timing information to generate modified timing information, and providing the modified timing information to the wireless communications network.

Paragraph 50. Apparatus for operating as a timing information egress entity for a wireless communications network, the apparatus comprising memory and a processor, the memory having stored thereon computer readable instructions, which when executed, cause the apparatus to perform the operations of: receiving timing information transmitted via the wireless communications network from a timing information ingress entity, receiving a propagation delay indication indicating a propagation delay of a signal transmitted via a wireless access interface and/or a sidelink of the wireless communications network, adjusting the received timing information to generate modified timing information, and providing the modified timing information to a timing information destination.

Paragraph 51. Apparatus according to paragraph 49 or paragraph 50, wherein the apparatus is a communications device.

Paragraph 52. Apparatus according to paragraph 49 or paragraph 50, wherein the apparatus is a core network entity of the wireless communications network.

Paragraph 53. A method of operating a communications device in a wireless communications network, the method comprising: establishing a connection via a wireless access interface of a serving cell with an infrastructure equipment of the wireless communications network, transmitting, via the connection, timing information, measuring a propagation delay associated with signals transmitted in a candidate cell, and transmitting to the infrastructure equipment a measurement report comprising an indication of the propagation delay.

Paragraph 54. A method according to paragraph 53, the method comprising receiving a handover command indicating that the communications device should select as its serving cell the candidate cell.

Paragraph 55. A method of operating an infrastructure equipment in a wireless communications network, the method comprising: establishing a connection via a wireless access interface of a serving cell with a communications device, receiving, via the connection, timing information transmitted by the communications device, receiving from the communications device a measurement report comprising an indication of a propagation delay associated with a candidate cell, determining that the propagation delay associated with the candidate cell is lower than a propagation delay incurred by transmissions by the communications device in the serving cell, and in response to determining that the propagation delay associated with the candidate cell is lower than the propagation delay incurred by transmissions by the communications device in the serving cell, initiating a handover of the communications device to the candidate cell.

Paragraph 56. A method according to paragraph 55, the method comprising transmitting a handover command to the communications device indicating that the communications device should select as its serving cell the candidate cell.

Paragraph 57. A method according to paragraph 55 or paragraph 56, the method comprising: transmitting to an infrastructure equipment associated with the candidate cell a time source indication, the time source indication indicating that the communications device is a source of timing information.

Paragraph 58. A communications device for operating in a wireless communications network, the communications device comprising a transmitter configured to transmit signals via a wireless access interface provided by an infrastructure equipment in a serving cell of the wireless communications network, a receiver configured to receive signals via the wireless access interface, and a controller configured to control the transmitter and the receiver so that the communications device is operable: to establish a connection via the wireless access interface, to transmit, via the connection, timing information, to measure a propagation delay associated with signals transmitted in a candidate cell, and to transmit to the infrastructure equipment a measurement report comprising an indication of the propagation delay.

Paragraph 59. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to establish a connection via the wireless access interface, to transmit, via the connection, timing information, to measure a propagation delay associated with signals transmitted in a candidate cell, and to transmit to the infrastructure equipment a measurement report comprising an indication of the propagation delay.

Paragraph 60. Infrastructure equipment for use in a wireless communications network, the infrastructure equipment providing a wireless access interface for communicating with a communications device in a serving cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to establish a connection via the wireless access interface with the communications device, receiving, via the connection, timing information transmitted by the communications device, receiving from the communications device a measurement report comprising an indication of a propagation delay associated with a candidate cell, determining that the propagation delay associated with the candidate cell is lower than a propagation delay incurred by transmissions by the communications device in the serving cell, and in response to determining that the propagation delay associated with the candidate cell is lower than the propagation delay incurred by transmissions by the communications device in the serving cell, initiating a handover of the communications device to the candidate cell.

Paragraph 61. Circuitry for an infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to establish a connection via the wireless access interface with the communications device, receiving, via the connection, timing information transmitted by the communications device, receiving from the communications device a measurement report comprising an indication of a propagation delay associated with a candidate cell, determining that the propagation delay associated with the candidate cell is lower than a propagation delay incurred by transmissions by the communications device in the serving cell, and in response to determining that the propagation delay associated with the candidate cell is lower than the propagation delay incurred by transmissions by the communications device in the serving cell, initiating a handover of the communications device to the candidate cell.

Paragraph 62. A method for operating a first communications device, the method comprising receiving timing information generated by a second communications device via a sidelink connection with the second communications device, determining that a third communications device can act as a relay communications device and provide access to services via a wireless access interface provided by an infrastructure equipment, in response to determining that the third communications device can act as a relay communications device, establishing a second sidelink connection with the third communications device, and receiving timing information from the infrastructure equipment via the third communications device acting the relay communications device.

Paragraph 63. A communications device for operating in a wireless communications network, the communications device comprising a transmitter configured to transmit signals via a sidelink with a second communications device, a receiver configured to receive signals via the sidelink, and a controller configured to control the transmitter and the receiver so that the communications device is operable: to receive timing information generated by the second communications device via the sidelink connection from the second communications device, to determine that a third communications device can act as a relay communications device and provide access to services via a wireless access interface provided by an infrastructure equipment, in response to determining that the third communications device can act as a relay communications device, to establish a second sidelink connection with the third communications device, and to receive timing information from the infrastructure equipment via the third communications device acting the relay communications device.

Paragraph 64. Circuitry for a communications device for operating in a wireless communications network, the circuitry comprising a transmitter configured to transmit signals via a sidelink with a second communications device, a receiver configured to receive signals via the sidelink, and a controller configured to control the transmitter and the receiver so that the communications device is operable: to receive timing information generated by the second communications device via the sidelink connection from the second communications device, to determine that a third communications device can act as a relay communications device and provide access to services via a wireless access interface provided by an infrastructure equipment, in response to determining that the third communications device can act as a relay communications device, to establish a second sidelink connection with the third communications device, and to receive timing information from the infrastructure equipment via the third communications device acting the relay communications device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.

[2] Holma H. and Toskala A, "LTE for UMTS OFDMA and SC-FDMA based radio access", John Wiley and Sons, 2009.

[3] 3GPP TR 38.913 "Study on scenarios and requirements for next generation access technologies"

[4] 3GPP TS 38.331 v.15.8.0

[5] 3GPP TS 23.501 v.16.4.0

[6] 3GPP document S2-2002594, "Study on enhanced support of Industrial IoT—TSC/URLLC enhancements", SA2 #137E

[7] 3GPP TS 38.300 v.15.8.0

[8] Co-pending European Application EP20169971.7

The invention claimed is:

1. A method of operating a communications device in a wireless communications network, the method comprising:

transmitting to an infrastructure equipment of the wireless communications network a time source indication, the time source indication indicating to the infrastructure equipment (i) that the communications device is acting as a timing information ingress entity by serving as a source of timing information and (ii) that the communications device is a point of ingress in the wireless communications network for the timing information; and transmitting a request to the infrastructure equipment to apply a modified operational algorithm with respect to the communications device based on the time source indication, the modified operational algorithm including an operational algorithm that differs in some aspect from a corresponding algorithm applied with respect to a communications device which has not been determined to be a source of timing information.

2. The method according to claim 1, wherein the communications device comprises a clock for generating the timing information, and the method further comprises generating the timing information.

3. The method according to claim 2, further comprising receiving an indication of an allocation of uplink communication resources from the infrastructure equipment, and transmitting to the infrastructure equipment, using the allocated uplink communication resources, the timing information.

4. The method according to claim 1, further comprising receiving the timing information.

5. The method according to claim 1, wherein the transmitting to the infrastructure equipment of the wireless communications network the time source indication includes transmitting a radio resource control (RRC) setup complete message comprising the time source indication.

6. The method according to claim 1, wherein the transmitting to the infrastructure equipment of the wireless communications network the time source indication includes transmitting a radio resource control (RRC) reconfiguration complete message comprising the time source indication.

7. The method of claim 1, wherein the modified operational algorithm comprises a modified radio resource control (RRC) connection release algorithm or a modified radio resource control (RRC) connection suspend algorithm.

8. The method of claim 1, wherein the modified operational algorithm comprises allocating periodic communication resources to the communications device based on a periodicity of the timing information.

9. The method of claim 1, wherein the modified operational algorithm comprises a modified handover procedure where the infrastructure equipment initiates a handover of the communications device to a candidate cell in response to determining that a propagation delay of the candidate cell is lower than a propagation delay of a serving cell.

10. The method of claim 1, wherein the modified operational algorithm comprises the infrastructure equipment prioritizing downlink data transmissions to the communications device over downlink data transmissions to other communications devices.

11. A method of operating an infrastructure equipment in a wireless communications network, the infrastructure equipment providing a wireless access interface for transmitting data to and receiving data from a communications device, the method comprising:

receiving a time source indication, the time source indication indicating to the infrastructure equipment (i) that the communications device is acting as a timing information ingress entity by serving as a source of timing information and (ii) that the communications device is a point of ingress in the wireless communications network for the timing information; and applying a modified operational algorithm with respect to the communications device based on the time source indication indicating (i) that the communications device is acting as the timing information ingress entity by serving as the source of timing information and (ii) that the communications device is the point of ingress in the wireless communications network for the timing information, the modified operational algorithm including an operational algorithm that differs in some aspect from a corresponding algorithm applied with respect to a communications device which has not been determined to be a source of timing information.

12. The method according to claim 11, wherein the time source indication is received via the wireless access interface from the communications device.

13. The method according to claim 11, wherein the time source indication is received from a core network entity of the wireless communications network.

14. The method according to claim 11, further comprising:

in response to receiving the time source indication, maintaining, in an active state, a radio resource control (RRC) connection with the communications device until either a request to release the RRC connection is received from the communications device or the infrastructure equipment determines that a serving cell of the communications device should be changed, and allocating uplink communication resources for the transmission of the timing information by the communications device.

15. The method according to claim 11, wherein the wireless access interface is provided in a first cell, and the method further comprises:

determining that a serving cell of the communications device should be changed to a second cell based on a propagation delay in the first cell and a propagation delay in the second cell, and in response to the determining that the serving cell of the communications device should be changed to the second cell and receiving the time source indication, initiating a handover of the communications device from the first cell to the second cell.

16. The method according to claim 15, wherein the determining that the serving cell of the communications device should be changed to the second cell includes determining that the propagation delay in the second cell is lower than the propagation delay in the first cell.

17. An apparatus for operating in a wireless communications network, the apparatus comprising:

a transmitter configured to transmit signals via a wireless access interface provided by an infrastructure equipment of the wireless communications network, a receiver configured to receive signals via the wireless access interface, and circuitry configured to control the transmitter and the receiver so that the apparatus is operable:

to determine a propagation delay of a transmission of a signal transmitted via the wireless access interface, to transmit a propagation delay indication to a timing information ingress entity that is a point of ingress in the wireless communications network for timing information or a timing information egress entity that is a point of egress in the wireless communications network for the timing information, the propagation delay indication being based on the determined propagation delay, to receive the timing information received at the wireless communications network at the timing information ingress entity that is the point of ingress in the wireless communications network for the timing information, to provide a time source indication, the time source indication indicating (i) that a communications device is acting as the timing information ingress entity by serving as a source of the timing information and (ii) that the communications device is the point of ingress in the wireless communications network for the timing information, to apply or request the application of a modified operational algorithm with respect to the communications device based on the time source indication indicating (i) that the communications device is acting as the timing information ingress entity by serving as the source of the timing information and (ii) that the communications device is the point of ingress in the wireless communications network for the timing information, the modified operational algorithm including an operational algorithm that differs in some aspect from a corresponding algorithm applied with respect to a communications device which has not been determined to be a source of timing information, and to transmit the timing information via the wireless access interface.

18. The apparatus according to claim 17, wherein the apparatus is an infrastructure equipment of the wireless communications network, and the apparatus provides the wireless access interface.

19. The apparatus according to claim 17, wherein the apparatus is a communications device.

20. The apparatus according to claim 19, wherein the apparatus is associated with the timing information ingress entity that is the point of ingress in the wireless communications network for the timing information or the timing information egress entity that is the point of egress in the wireless communications network for the timing information.

* * * * *